US 12,159,323 B2

(12) United States Patent
Okabe et al.

(10) Patent No.: US 12,159,323 B2
(45) Date of Patent: Dec. 3, 2024

(54) VEHICLE MONITORING APPARATUS, VEHICLE MONITORING SYSTEM, AND VEHICLE MONITORING METHOD

(71) Applicant: Panasonic Intellectual Property Management Co., Ltd., Osaka (JP)

(72) Inventors: Yoshimasa Okabe, Kanagawa Ken (JP); Takashi Okohira, Tokyo To (JP); Yuya Hamai, Kanagawa Ken (JP); Yudai Ishibashi, Osaka Fu (JP); Naoki Hayashi, Kanagawa Ken (JP); Toshihiko Hashinaga, Tokyo To (JP); Jun Nakai, Kanagawa Ken (JP); Kiyohiko Fujiwara, Kanagawa Ken (JP); Masato Yuda, Osaka Fu (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 442 days.

(21) Appl. No.: 17/684,819

(22) Filed: Mar. 2, 2022

(65) Prior Publication Data

US 2022/0309602 A1     Sep. 29, 2022

(30) Foreign Application Priority Data

Mar. 24, 2021   (JP) .................. 2021-049927

(51) Int. Cl.
*G06V 20/56*     (2022.01)
*G06F 16/955*    (2019.01)
(Continued)

(52) U.S. Cl.
CPC ....... *G06Q 50/265* (2013.01); *G06F 16/9554* (2019.01); *G06T 7/0008* (2013.01);
(Continued)

(58) Field of Classification Search
None
See application file for complete search history.

(56) References Cited

U.S. PATENT DOCUMENTS 10,706,321 B1 *   7/2020   Chen ................. G06T 3/4007
11,257,204 B2 *   2/2022   Ranca ............... G06F 18/2148
(Continued)

FOREIGN PATENT DOCUMENTS

JP      2008-221906        9/2008
JP      2010-257249        11/2010
(Continued)

OTHER PUBLICATIONS

Office Action from Japan Patent Office (JPO) in Japanese Patent Appl. No. 2021-049927, dated Feb. 28, 2023, together with an English language translation.

*Primary Examiner* — Tsung Yin Tsai
(74) *Attorney, Agent, or Firm* — Greenblum & Bernstein, P.L.C.

(57) ABSTRACT

A vehicle monitoring apparatus includes a hardware processor functioning as an image acquisition unit, an abnormality information acquisition unit, a damage determination unit, and a damage reporting unit. The image acquisition unit serves to acquire a captured image including an image representation of an exterior of a vehicle body of a vehicle. The abnormality information acquisition unit serves to acquire vehicle-body abnormality information indicating an abnormality in the vehicle body. The damage determination unit serves to determine presence or absence of damage to the vehicle body on the basis of the captured image and the vehicle-body abnormality information. The damage report-
(Continued)

ing unit serves to report, to an information processing apparatus, a damage report including the captured image or an image generated on the basis of the captured image. The damage report is reported in accordance with on a result of the determination on the damage.

19 Claims, 16 Drawing Sheets

(51) Int. Cl.
  G06Q 50/26 (2012.01)
  G06T 7/00 (2017.01)
  G06T 17/20 (2006.01)
(52) U.S. Cl.
  CPC .............. G06T 17/20 (2013.01); G06V 20/56 (2022.01); *G06T 2207/20068* (2013.01); *G06T 2207/30252* (2013.01)

(56) References Cited

U.S. PATENT DOCUMENTS

| | | | |
|---|---|---|---|
| 2014/0085477 A1* | 3/2014 | Takano | G06V 20/56 |
| | | | 348/148 |
| 2016/0193983 A1 | 7/2016 | Sawada | |
| 2016/0364842 A1* | 12/2016 | Kiyo | H04N 7/181 |
| 2018/0260793 A1* | 9/2018 | Li | G06Q 40/08 |
| 2019/0026557 A1* | 1/2019 | Watanabe | G06V 20/56 |
| 2020/0031299 A1* | 1/2020 | Yasugi | B60R 21/013 |
| 2021/0053529 A1 | 2/2021 | Sawada | |
| 2021/0081698 A1* | 3/2021 | Lindeman | G06Q 30/0283 |
| 2022/0309602 A1* | 9/2022 | Okabe | G06F 16/9554 |

FOREIGN PATENT DOCUMENTS

| | | |
|---|---|---|
| JP | 6347934 | 6/2018 |
| JP | 2019-080157 | 5/2019 |
| JP | 2020-017077 | 1/2020 |
| JP | 2020-017960 | 1/2020 |
| KR | 2016-0028542 | 3/2016 |

\* cited by examiner

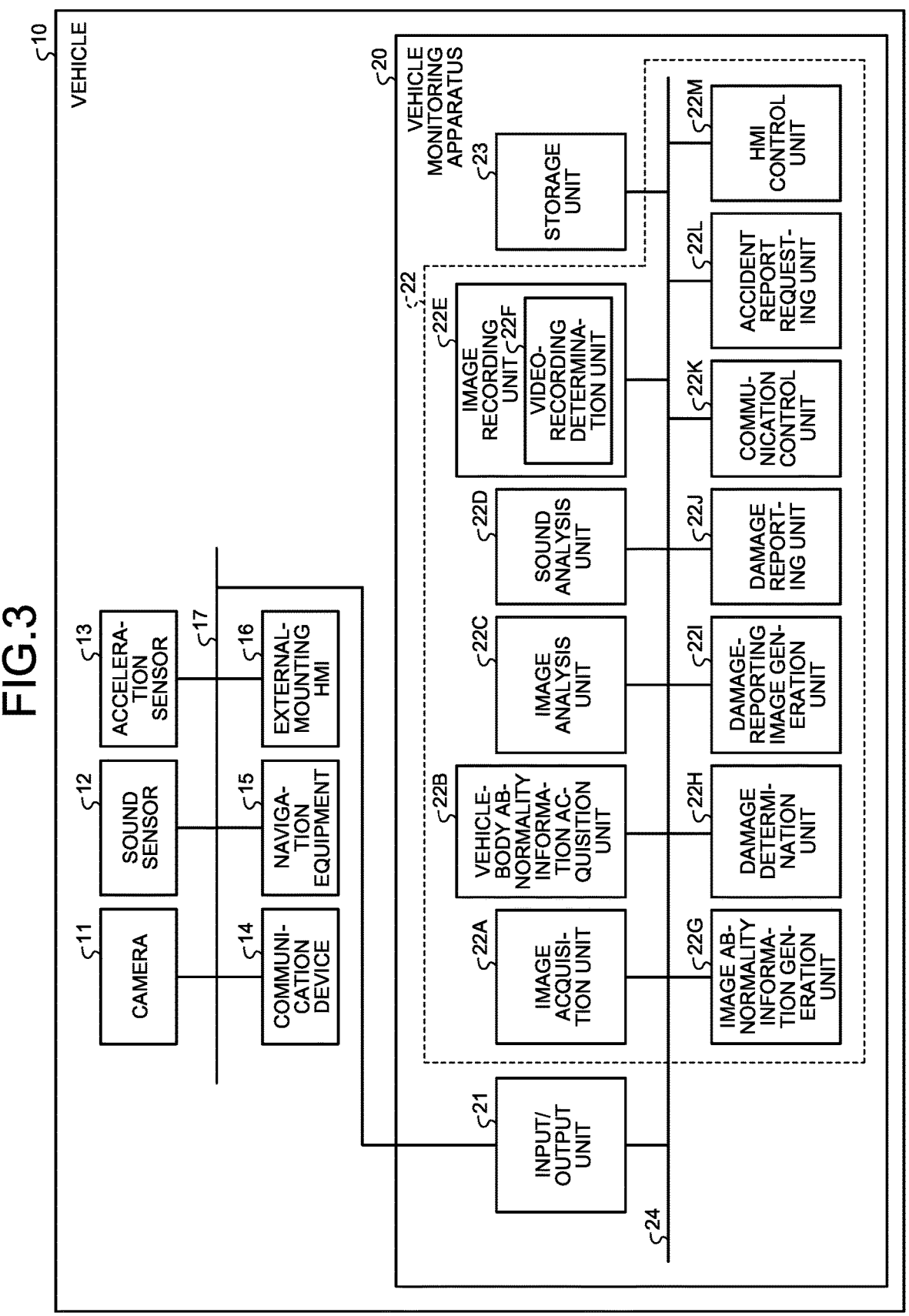

TWO-DIMENSIONAL CODE (QR CODE®)

BARCODE 1 2 3 4 5 6 7 8 9 0 2

VEHICLE MONITORING APPARATUS, VEHICLE MONITORING SYSTEM, AND VEHICLE MONITORING METHOD

CROSS-REFERENCE TO RELATED APPLICATIONS

This application is based upon and claims the benefit of priority from Japanese Patent Application No. 2021-049927, filed on Mar. 24, 2021, the entire contents of which are incorporated herein by reference.

FIELD

The present disclosure relates generally to a vehicle monitoring apparatus, a vehicle monitoring system, and a vehicle monitoring method.

BACKGROUND

There are known systems for remotely monitoring a vehicle. As one example, a technique has been known for transmitting a synthesized image obtained by synthesizing captured images of the entire circumference of a vehicle to the outside of the vehicle. In such a technique, for example, a synthesized image of images captured by cameras installed in the side-view mirror, front-end portion, and rear-end portion of a vehicle is created and then transmitted to a smartphone carried by a vehicle user (for example, Japanese Patent Publication No. 6347934 B).

The technique in the related art creates a synthesized image by incorporating an image representation of a prepared three-dimensional (3D) model of a vehicle body into the center corresponding to a vehicle of an omnidirectional image, which is obtained by synthesizing the captured images of the entire circumference of the vehicle. For this reason, in the technique in the related art, the user or owner of the vehicle fails to check the actual exterior condition of the vehicle because only a 3D model image representation rather than an actual image of a vehicle body as a vehicle image of the synthesized image is displayed on a smartphone carried by the user or owner of the vehicle. In other words, according to the related art, in a case of an accident in which a vehicle is damaged, although the image of the surroundings of the vehicle is shown on the smartphone of the user or owner of the vehicle, the actual image representation of the vehicle itself is not shown in the displayed image. Thus, it is necessary for the user or owner of the vehicle to visit the accident scene or actually visually check the exterior of the vehicle directly, which imposes a physical burden on the user or owner of the vehicle. In addition, the user or owner of the vehicle who is a victim of the vehicle accident, when visiting the accident scene, is likely to encounter a perpetrator. Furthermore, even in the process of handling the accident to receive compensation for the damage, the victim's personal information is likely to be obliged to be exposed to the perpetrator. Such a thing can be a great psychological burden on the user or owner of the vehicle. In other words, the related art imposes a heavy burden on the user or owner of the vehicle.

SUMMARY

A vehicle monitoring apparatus according to the present disclosure includes a hardware processor connected to a memory. The hardware processor is configured to function as an image acquisition unit, an abnormality information acquisition unit, a damage determination unit, and a damage reporting unit. The image acquisition unit serves to acquire a captured image including an image representation of an exterior of a vehicle body of a vehicle. The abnormality information acquisition unit serves to acquire vehicle-body abnormality information indicating an abnormality in the vehicle body. The damage determination unit serves to determine presence or absence of damage to the vehicle body on the basis of the captured image and the vehicle-body abnormality information. The damage reporting unit serves to report, to an information processing apparatus, a damage report including the captured image or an image generated on the basis of the captured image. The damage report is reported in accordance with on a result of the determination on the damage.

BRIEF DESCRIPTION OF THE DRAWINGS

FIG. 3 is a functional block diagram of a vehicle according to the embodiment;

DETAILED DESCRIPTION

Embodiments of a vehicle monitoring apparatus, a vehicle monitoring system, and a vehicle monitoring method according to the present disclosure will be described with reference to the accompanying drawings.

The description is given of the vehicle monitoring apparatus, the vehicle monitoring system, and the vehicle monitoring method according to the present embodiment as an example of the modes implemented in Japan. However, the country in which the vehicle monitoring apparatus, the vehicle monitoring system, and the vehicle monitoring method according to the present embodiment can be implemented is not limited to Japan.

Figure 1:
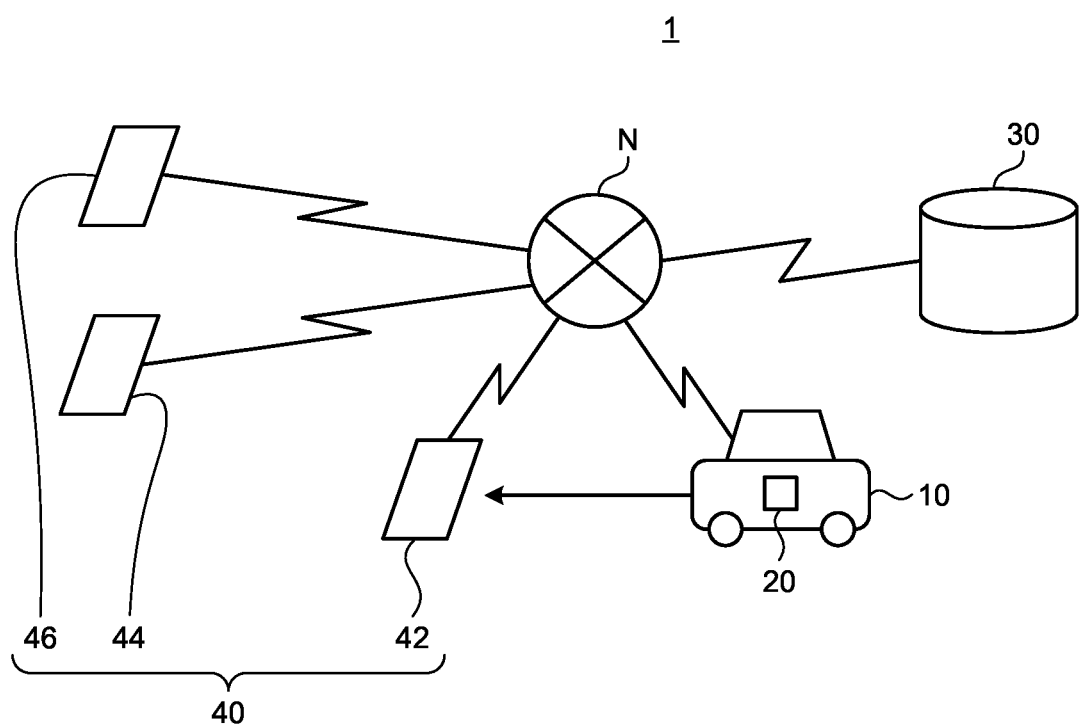
FIG. 1 is a diagram illustrating an example of a vehicle monitoring system according to an embodiment.

FIG. 1 is a diagram illustrating an example of a vehicle monitoring system 1 according to the present embodiment.

The vehicle monitoring system 1 includes a vehicle monitoring apparatus 20 equipped in a vehicle 10, an accident reporting server 30, and a mobile device 40. The vehicle monitoring apparatus 20, the accident reporting server 30, and the mobile device 40 are connected to each other to be capable of communicating with each other via a public network N.

The vehicle monitoring system 1 executes various types of associated processing between the vehicle monitoring apparatus 20, the accident reporting server 30, and the mobile device 40 on the basis of a result of monitoring the vehicle 10. The details of such processing are described later.

The vehicle 10 is a two-wheeled, three-wheeled, or four-wheeled motor vehicle or the like. In the present embodiment, the description is given of a case where the vehicle 10 is a four-wheeled motor vehicle as an example. Examples of the vehicle 10 can be any vehicle including vehicles that travel through a human driving operation or vehicles that can autonomously travel without the human driving operation.

The vehicle monitoring apparatus 20 is a device that monitors the vehicle 10. In the present embodiment, the description is given by taking an exemplary mode in which the vehicle monitoring apparatus 20 is attached to the vehicle 10.

The accident reporting server 30 is an example of an information processing apparatus. The accident reporting server 30 is a server that provides an accident report agency service. The accident report agency service is a service that exchanges various types of information generated among the victim, the perpetrator, and the police on behalf of the victim and the perpetrator upon the occurrence of an accident for the vehicle 10. The accident reporting server 30 is managed by, for example, an insurance company. In the present embodiment, the description is given of the accident reporting server 30 as an example of the form that is managed by an insurance company of vehicle insurance.

The mobile device 40 is an example of an information processing apparatus. The mobile device 40 is an information processing apparatus operated by the user or owner of the mobile device 40. Examples of the mobile device 40 include but are not limited to a smartphone, a tablet, and the like.

In the vehicle monitoring system 1 according to the present embodiment, the mobile device 40 is a general term for a perpetrator mobile device 42, a victim mobile device 44, and a police officer mobile device 46.

The perpetrator mobile device 42 is an information processing apparatus carried by a perpetrator of an accident of the vehicle 10. The perpetrator is, for example, a person who is responsible for damage to the vehicle 10. The victim mobile device 44 is an information processing apparatus carried by a victim who is the user or owner of the vehicle 10. The police officer mobile device 46 is an information processing apparatus carried by a police officer or an information processing apparatus managed by the police. In the present embodiment, the victim is referred to as the "user or owner" of a vehicle. However, the term "user or owner" is redundant to be described herein, and in many cases, the user of the vehicle is the owner of the vehicle, so it can be said that it is meaninglessly redundant. Although the user and owner of a vehicle are often different in the case of various types of ownership such as a rental car or car leasing, considering that "the person who monitors the parked vehicle and responds upon being damaged is the user rather than the owner", the description hereinafter is given of being referred to as only "user", the term "user" can be read interchangeably as "user or owner".

Figure 2A:
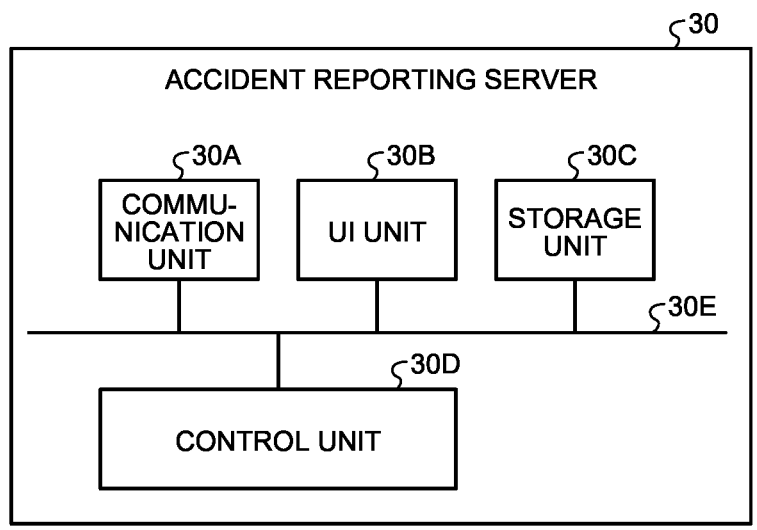
FIG. 2A is a functional block diagram of an accident reporting server according to the embodiment.

FIG. 2A is a functional block diagram of an example of the accident reporting server 30. The accident reporting server 30 includes a communication unit 30A, a user interface (UI) unit 30B, a storage unit 30C, and a control unit 30D. The communication unit 30A, the UI unit 30B, the storage unit 30C, and the control unit 30D are connected to each other to be capable of communicating with each other via a bus 30E.

The communication unit 30A transmits or receives various types of information to or from other information processing apparatuses and the vehicle monitoring apparatus 20. In one example, the communication unit 30A communicates with each of the vehicle monitoring apparatus 20 and the other mobile device 40 via the public network N. The UI unit 30B has a function of receiving various operation instructions and a function of outputting various types of information. The reception function is implemented by, for example, a touch panel, an operation key, a keyboard, a pointing device, a mouse, an input button, a microphone, or the like. The output function is an image display function, a sound output function, or the like. The image display function is implemented by, for example, a known liquid-crystal display (LCD), an organic electro-luminescence (EL) display, or the like. The sound output function is implemented by, for example, a speaker. The storage unit 30C stores communication data exchanged between the accident reporting server 30 and the vehicle monitoring apparatus 20 and between the accident reporting server 30 and the mobile device 40 (including the perpetrator mobile device 42, the victim mobile device 44, and the police officer mobile device 46). The storage unit 30C stores application software used for the transmission of various types of information by the mobile device 40 to the accident reporting server 30. The accident reporting server 30 transfers the application software stored in the storage unit 30C to the mobile device 40 in response to access from the mobile device 40. The control unit 30D causes the accident reporting server 30 to execute various types of processing.

Figure 2B:
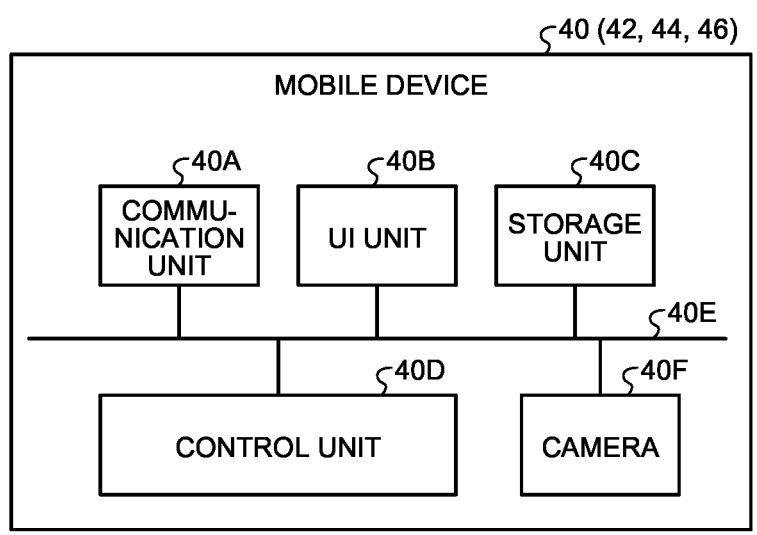
FIG. 2B is a functional block diagram of a mobile device according to the embodiment.

FIG. 2B is a functional block diagram of an example of the mobile device 40 (42, 44, 46). The mobile device 40 includes a communication unit 40A, a UI unit 40B, a storage unit 40C, a camera 40F, and a control unit 40D The communication unit 40A, the UI unit 40B, the storage unit 40C, the camera 40F, and the control unit 40D are connected to each other to be capable of communicating with each other via a bus 40E.

The communication unit 40A is configured to be able to transmit and receive various types of information to and from other information processing apparatuses. In one example, the communication unit 40A communicates with each of the accident reporting server 30 and the vehicle monitoring apparatus 20 via the public network N. However, the mobile device 40 that communicates with the vehicle monitoring apparatus 20 is limited to the victim mobile device 44, and the perpetrator mobile device 42 and the police officer mobile device 46 do not communicate with the vehicle monitoring apparatus 20. The UI unit 40B has a function of receiving various operation instructions and a function of outputting various types of information. The storage unit 40C is a built-in memory of the mobile device 40 and stores application software used by the mobile device 40 to transmit various types of information to the accident reporting server 30. The camera 40F obtains captured image data by the image capturing. The camera 40F is, for example, a built-in camera of the mobile device 40. The description is hereinafter given that the captured image data is referred simply to as a captured image. The control unit 40D causes the mobile device 40 to execute various types of processing. The various types of processing include the execution of application software used by the mobile device 40 to transmit various types of information to the accident reporting server 30. The application software informs the user of the mobile device 40 of an operation to be performed by displaying a predetermined message on the UI unit 40B. Then, the camera 40F is activated in response to the operation by the user of the mobile device 40 to perform the image capturing. The various types of processing include the transmission of the captured image to the accident reporting server 30 via the communication unit 40A with the checking and approval of the user of the mobile device 40.

In a case where the mobile device 40 is the perpetrator mobile device 42, the application software is downloaded to the storage unit 40C at the time when an accident occurs. A means for causing the perpetrator to download the application software will be described later.

In a case where the mobile device 40 is the victim mobile device 44, the application software can be downloaded to the storage unit 40C at any time of the occurrence of accident, purchase of the vehicle 10, the attachment of the vehicle monitoring apparatus 20 to the vehicle 10, or contract of vehicle insurance.

The police officer mobile device 46 can be a non-portable information processing apparatus, for example, a server managed by the police or can be a combination of a mobile device and a server. This is because an image capturing an accident scene is acquired by any of the vehicle monitoring apparatus 20, the perpetrator mobile device 42, and the victim mobile device 44, and so the police officer does not need to visit the accident scene in the case where the system according to the present application functions favorably.

While the present embodiment describes the case where the accident reporting server 30 is managed by a vehicle insurance company, the server managed by the police can be identical to the accident reporting server 30. In this case, transmitting the image capturing the accident scene or various types of information to the accident reporting server 30 managed by the police is performed by not the use of the accident report agency service but the accident report itself. Thus, it can be understood that the step of reporting the accident to the police by the accident reporting server 30 is omitted.

Note that the functional configurations of the accident reporting server 30 and the mobile device 40 illustrated in FIGS. 2A to 2B are examples, and are not limited to the functional configurations illustrated in FIGS. 2A to 2B.

FIG. 3 is a functional block diagram of an example of the vehicle 10. The vehicle 10 includes a camera 11, a sound sensor 12, an acceleration sensor 13, a communication device 14, navigation equipment 15, an external-mounting human-machine interface (HMI) 16, and a vehicle monitoring apparatus 20. The camera 11, the sound sensor 12, the acceleration sensor 13, the communication device 14, the navigation equipment 15, the external-mounting HMI 16, and the vehicle monitoring apparatus 20 are connected to each other to be capable of communicating with each other via an in-vehicle local area network (LAN) 17.

The camera 11 acquires a captured image, that is, data of the captured image by the image capturing. The sound sensor 12 acquires sound data. The sound sensor 12 is, for example, a microphone. The term "sound data" is simply referred to as sound hereinafter. The acceleration sensor 13 is a sensor that senses the acceleration applied to the vehicle 10. The communication device 14 is a communication device for communicating with each of the accident reporting server 30 and the victim mobile device 44 via the public network N. The navigation equipment 15 is a system equipped with a global positioning system (GPS) function and detects the position information of the vehicle 10. The external-mounting HMI 16 outputs various types of information to the outside of the vehicle 10. Examples of the external-mounting HMI 16 include but are not limited to a display, a speaker, lighting, or the like.

Figure 4:
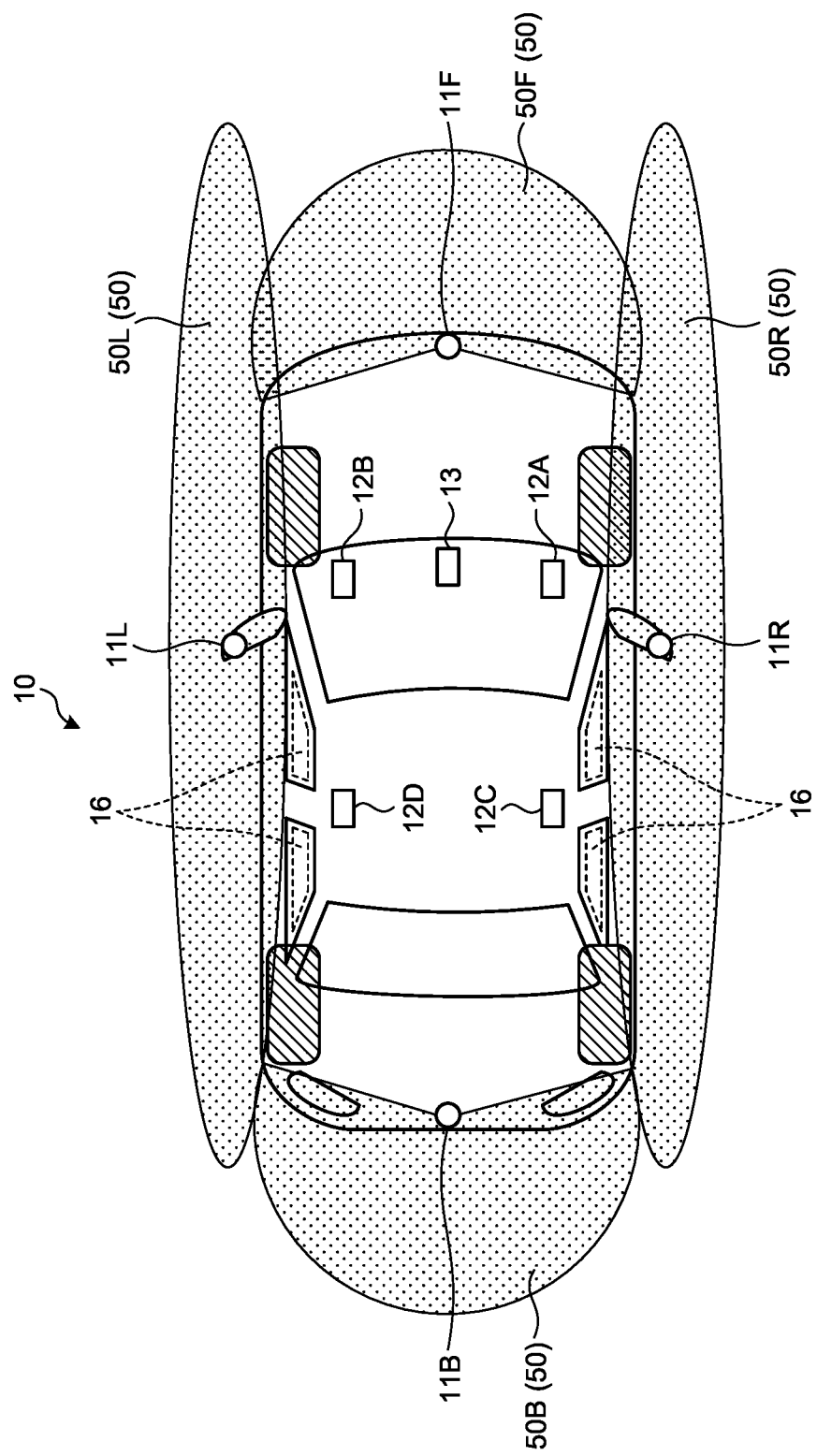
FIG. 4 is a schematic diagram illustrating the arrangement of a camera, a sound sensor, and an acceleration sensor according to the embodiment.

FIG. 4 is a schematic diagram illustrating an example of the arrangement of the camera 11, the sound sensor 12, and the acceleration sensor 13 in the vehicle 10.

The installation position and angle of view of the camera 11 are adjusted in advance so that the entire circumference of the vehicle 10 can be captured. The camera 11 has a visual field range 50 including the exterior of the vehicle body of the vehicle 10. The camera 11 is referred to as an imaging sensor or an in-vehicle camera in some cases. In the present embodiment, the vehicle 10 includes a plurality of cameras 11 having different visual field ranges 50. Moreover, a part of the visual field range of the plurality of cameras 11 can overlap.

In one example, the vehicle 10 is provided with a camera 11F, a camera 11B, a camera 11R, and a camera 11L as examples of the camera 11. Moreover, the number of cameras 11 provided in the vehicle 10 is not limited to four.

The camera 11F is arranged at the front-end portion of the vehicle 10. The camera 11B is arranged at the rear-end portion of the vehicle 10. The camera 11F is arranged to capture an image of a front bumper of the vehicle 10, and the camera 11B is arranged to capture an image of a rear bumper of the vehicle 10.

The camera 11R is arranged, for example, at the right side-view mirror of the vehicle 10. The camera 11L is arranged, for example, at the left side-view mirror of the vehicle 10. In other words, the camera 11R is arranged to capture an image of the right-handed area of the vehicle 10, and the camera 11L is arranged to capture an image of the left-handed area of the vehicle 10.

The camera 11R, the camera 11L, the camera 11F, and the camera 11B acquire captured images obtained by capturing the entire circumference of the vehicle 10 including the exterior of the vehicle body of the vehicle 10 in their respective different directions. In addition, the lenses provided in each of the camera 11R, the camera 11L, the camera 11F, and the camera 11B have a shorter focal length than a standard lens and have a visual field range 50 with an angle of view of 180 degrees or more. Thus, the use of these cameras 11 makes it possible to capture the entire circumference of the vehicle 10.

In the present embodiment, the description is given of each of the camera 11R, the camera 11L, the camera 11F, and the camera 11B as an example having a visual field range 50 of approximately 190 degrees. In the present embodiment, for a visual field range 50R of the camera 11R, a visual field range 50F of the camera 11F, a visual field range 50L of the camera 11L, and a visual field range 50B of the camera 11B, the cameras 11 are installed in such a way that the adjacent visual field ranges 50 overlap in parts.

Moreover, the installation positions and numbers of the cameras 11 can be adjusted so long as a captured image of the entire circumference centered on the vehicle 10 including the exterior of the vehicle 10 can be acquired. Their installation positions and numbers are not limited to those illustrated in FIG. 4.

The installation positions and numbers of the sound sensor 12 to be arranged are adjusted in advance in such a way as to sense sound or noise generated from the vehicle 10. In one example, the vehicle 10 includes a microphone 12A, a microphone 12B, a microphone 12C, and a microphone 12D as the sound sensor 12. These microphones 12A, 12B, 12C, and 12D are arranged at different positions from each other. Moreover, the number of sound sensors 12 provided in the vehicle 10 is not limited to four.

The microphone 12A is arranged at a position where the sound on the right front side of the vehicle 10 can be sensed. The microphone 12B is arranged at a position where the sound on the left front of the vehicle 10 can be sensed. The microphone 12C is arranged at a position where the sound on the right rear side of the vehicle 10 can be sensed. The microphone 12D is arranged at a position where the sound on the left rear side of the vehicle 10 can be sensed.

The acceleration sensor 13 is provided in, for example, a navigation system. The acceleration sensor 13 is a 3-axis acceleration sensor and senses the rate of acceleration variation in each of the front-rear, left-right, and up-down directions.

The external-mounting HMI 16 is a device for notifying the outside of the vehicle 10 of various types of information. In the present embodiment, the description is given of the case where the external-mounting HMI 16 is a transparent display installed in the side-view window of the vehicle 10 as an example. Moreover, the external-mounting HMI 16 is not limited to the form installed in the side-view window of the vehicle 10.

The description continues referring back to FIG. 3. As described above, the vehicle 10 according to the present embodiment includes the camera 11, the sound sensor 12, the acceleration sensor 13, the communication device 14, the navigation equipment 15, the external-mounting HMI 16, and the vehicle monitoring apparatus 20. In the case where the vehicle 10 is parked, the vehicle monitoring apparatus 20 controls various devices and equipment in the vehicle so that they monitor the vehicle and the surroundings of the vehicle. For this purpose, the vehicle 10 according to the present embodiment is capable of monitoring the outside of the vehicle 10 using the sound sensor 12, the acceleration sensor 13, and the camera 11 that captures the entire circumference of the vehicle 10. In addition, the vehicle monitoring apparatus 20 has a function of recording a captured image or the like captured with the camera 11. In addition, the vehicle monitoring apparatus 20 uses the communication device 14 to be capable of communicating with the accident reporting server 30 and the victim mobile device 44 via the public network N. In addition, the vehicle monitoring apparatus 20 is capable of notifying the accident reporting server 30 of position information of the vehicle that includes the vehicle monitoring apparatus 20. The position information is obtained by the navigation equipment 15. In addition, the vehicle monitoring apparatus 20 notifies the outside of the vehicle of notification information used to request a perpetrator to report the accident via the external-mounting HMI 16. Details of the notification information will be described later.

The vehicle monitoring apparatus 20 will be described in detail. The vehicle monitoring apparatus 20 includes an input/output unit 21, a control unit 22, and a storage unit 23. The input/output unit 21, the control unit 22, and the storage unit 23 are connected to each other to be capable of communicating with each other via an internal bus 24.

The input/output unit 21 is a communication interface that communicates with the camera 11, the sound sensor 12, the acceleration sensor 13, the communication device 14, the navigation equipment 15, and the external-mounting HMI 16 via the in-vehicle LAN 17. The vehicle monitoring apparatus 20 transmits and receives commands, information, or an image to and from the camera 11, the sound sensor 12, the acceleration sensor 13, the communication device 14, the navigation equipment 15, and the external-mounting HMI 16 via the in-vehicle LAN 17.

The storage unit 23 stores various types of information. The storage unit 23 is, for example, a random-access memory (RAM), a semiconductor memory device such as flash memory, a hard disk, an optical disk, or the like. Moreover, the storage unit 23 can be a storage device provided on the exterior of the vehicle monitoring apparatus 20. In addition, the storage unit 23 can be a storage device that includes a combination of a removable storage medium and a device used to read and write data from and to the storage medium. In addition, the storage unit 23 can include a plurality of storage devices.

The control unit 22 is a functional block having a CPU called a processor as the main component and executes various types of processing.

Figure 5:
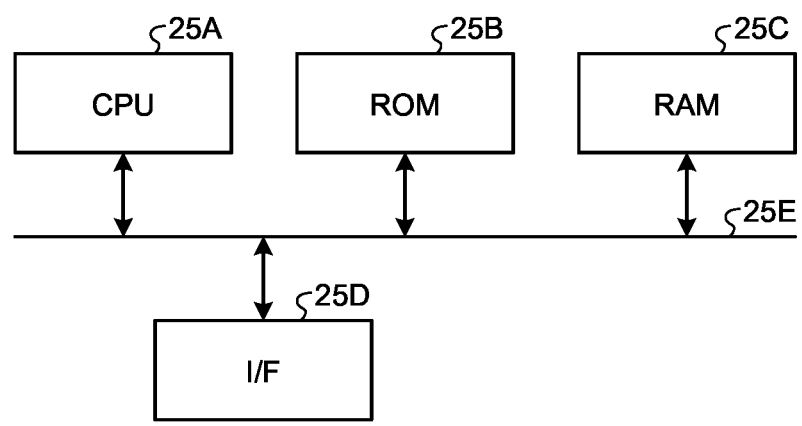
FIG. 5 is a diagram illustrating a hardware configuration according to the embodiment.

FIG. 5 illustrates a typical configuration example of the control unit and is a diagram illustrated to describe a hardware configuration example of each of the control unit 22 of the vehicle monitoring apparatus 20, the control unit 30D of the accident reporting server 30, and the control unit 40D of the mobile device 40.

A central processing unit (CPU) 25A, a read-only memory (ROM) 25B, a random-access memory (RAM) 25C, an I/F 25D, and the like are connected to each other via a bus 25E.

The CPU 25A (an example of the hardware processor) is an arithmetic logic unit called a processor. The ROM 25B stores a program that defines information processing to be executed by the CPU 25A. The ROM 25B typically includes a plurality of semiconductor devices, and a part of the ROM 25B is a rewritable non-volatile memory area such as flash memory. The RAM 25C stores data that is necessary for the CPU 25A to execute processing. The program can be stored in the RAM 25C. The I/F 25D is an interface for transmitting and receiving data and programs. A program created for a specific purpose is called application software, and the processing of incorporating application software from the outside is called downloading. The CPU 25A downloads application software via the I/F 25D, stores the application software in the RAM 25C, and then executes the application software. In addition, the CPU 25A copies the application software stored in the RAM 25C to the portion configured as the flash memory of the ROM 25B. This eliminates the need to download the application again even if the power supply to the control unit is temporarily removed.

The program that defines the information processing executed by each of the control unit 22, the control unit 30D, and the control unit 40D according to the present embodiment can be provided by being incorporated in the ROM 25B or the like in advance or can be downloaded from external sources via the I/F 25D. Moreover, the program executed by each of the control unit 22, the control unit 30D, and the control unit 40D according to the present embodiment can be provided by being recorded on a computer-readable recording medium in a file format. This file format can be installed and executed in each of the control unit 22, the control unit 30D, and the control unit 40D. Examples of the computer-readable recording medium include CD-ROM, a flexible disk (FD), CD-R, and a digital versatile disc (DVD). The program stored in an external server via a public line can be used.

The description continues referring back to FIG. 3.

The control unit 22 of the vehicle monitoring apparatus 20 includes an image acquisition unit 22A, a vehicle-body abnormality information acquisition unit 22B, an image analysis unit 22C, a sound analysis unit 22D, an image recording unit 22E, an image abnormality information generation unit 22G, a damage determination unit 22H, a damage-reporting image generation unit 22I, a damage reporting unit 22J, a communication control unit 22K. an accident report requesting unit 22L, and an HMI control unit 22M. The image recording unit 22E has a video-recording determination unit 22F.

The image acquisition unit 22A, the vehicle-body abnormality information acquisition unit 22B, the image analysis unit 22C, the sound analysis unit 22D, the image recording unit 22E, the video-recording determination unit 22F, the image abnormality information generation unit 22G, the damage determination unit 22H, the damage-reporting image generation unit 22I, the damage reporting unit 22J, the communication control unit 22K, the accident report requesting unit 22L, and the HMI control unit 22M are functional blocks. Each of them does not correspond to one device or hardware. In one example, one processor can execute the processing of all the functional blocks, or a plurality of processors can execute the processing of one functional block. The functions of the respective blocks mentioned above can be implemented by causing a processor such as the CPU 25A to execute a program, that is, by software, or can be implemented by a dedicated LSI specialized for specific processing such as image processing, that is, by hardware. In addition, or alternatively, the functions can be implemented by a combination of software and hardware. In the case where a plurality of processors is used, each of the plurality of processors can execute the processing of one functional block or can execute the processing of two or more functional blocks.

The processor implements each of the plurality of components described above by fetching and executing the program stored in the storage unit 23. Moreover, the program can be directly incorporated in a circuit of the processor instead of being stored in the storage unit 23. In this case, the processor implements each of the plurality of components described above by fetching and executing the program incorporated in the circuit.

The input/output unit 21, the image acquisition unit 22A, the vehicle-body abnormality information acquisition unit 22B, the image analysis unit 22C, the sound analysis unit 22D, the image recording unit 22E, the video-recording determination unit 22F, the image abnormality information generation unit 22G, the damage determination unit 22H, the damage-reporting image generation unit 22I, the damage reporting unit 22J, the communication control unit 22K, the accident report requesting unit 22L, the HMI control unit 22M, and the storage unit 23 are connected to each other via the internal bus 24 and operate in cooperation with each other.

The image acquisition unit 22A acquires a captured image including an image representation showing the exterior of the vehicle body of the vehicle 10. In the present embodiment, the image acquisition unit 22A acquires the captured image from each of the camera 11R, the camera 11L, the camera 11B, and the camera 11F, which are the cameras 11.

The vehicle-body abnormality information acquisition unit 22B acquires vehicle-body abnormality information. The vehicle-body abnormality information is information indicating an abnormality in the vehicle body of the vehicle 10. The vehicle-body abnormality information includes at least one piece of information about acceleration sensed by the acceleration sensor 13 or information about sound sensed by the sound sensor 12. The information about sound is hereinafter referred to as sound information, and the information about acceleration is hereinafter referred to as acceleration information in some cases. In the present embodiment, the description is given of an exemplary mode in which the vehicle-body abnormality information includes the acceleration information and the sound information.

The image analysis unit 22C analyzes the captured image acquired by the image acquisition unit 22A. The image analysis unit 22C extracts a difference between the captured images having different image-capturing timings with respect to the captured images obtained by the camera 11. In other words, the image analysis unit 22C analyzes variation in the image representation included in the captured image. Specifically, the image analysis unit 22C analyzes variation in the image representation of the exterior of the vehicle body of the vehicle 10, which are included in the captured image.

Specifically, the image analysis unit 22C extracts a difference between the captured images having different image-capturing timings with respect to the captured images by each of the camera 11R, the camera 11L, the camera 11B, and the camera 11F. Any known technique can be used so long as the difference between the captured images is extracted. The image analysis unit 22C outputs a result obtained by analyzing the captured image to the video-recording determination unit 22F and the image abnormality information generation unit 22G.

The sound analysis unit 22D analyzes the sound information about the sound sensed by the sound sensor 12. The sound analysis unit 22D analyzes the sound information about the sound sensed by the sound sensor 12, which is included in the vehicle-body abnormality information acquired by the vehicle-body abnormality information acquisition unit 22B. The sound analysis unit 22D outputs a result obtained by analyzing the sound information to the video-recording determination unit 22F, the image abnormality information generation unit 22G, the video-recording determination unit 22F, or the like.

The image recording unit 22E records the captured image that is obtained by the camera 11 in the storage unit 23. The image recording unit 22E includes the video-recording determination unit 22F.

The video-recording determination unit 22F determines whether or not to record the captured image on the basis of the vehicle-body abnormality information.

In this regard, in the case where the vehicle 10 is parked and it is not determined that damage is likely to occur, the camera 11 captures a still image by frame-dropping. The video-recording determination unit 22F determines that damage is likely to occur in the case where the analysis results obtained by the image analysis unit 22C and the sound analysis unit 22D indicate the detection of an object approaching the vehicle 10. The object approaching the vehicle 10 is, for example, a person or another vehicle approaching the vehicle 10. Then, if the video-recording determination unit 22F determines that damage is likely to occur, the video-recording determination unit 22F switches the image capturing from the still image capturing to the moving image capturing and initiates video-recording of the captured image obtained by the moving image capturing. The initiation of video-recording means that recording the captured image in the storage unit 23 is initiated.

In one example, a case is considered where the vehicle 10 is parked in a parking space and another vehicle is detected trying to park in a parking frame next to the parking space where the vehicle 10 is parked. In this case, the still image capturing is switched to the moving image capturing from a time point when another vehicle is detected, and the image recording unit 22E continues the moving image capturing until the state of no motion of an object around the vehicle 10 is kept for a predetermined time (e.g., one minute). This is intended to record, as a captured image, the moment of hitting the vehicle 10 with the door of another vehicle in the case where the door of the other vehicle being parked next to the vehicle 10 opens and hits the vehicle 10.

Moreover, the video-recording determination unit 22F can switch the still image capturing to the moving image capturing in the case where damage is likely to occur, such as an approaching object or the case where it is determined that damage has occurred, and then can initiate the video-recording on the captured image obtained by the moving image capturing. In addition, the video-recording determination unit 22F can record the captured still image in the storage unit 23 at a low occurrence frequency at a timing other than the moving image capturing. The low occurrence frequency can be a predetermined interval, for example, one frame every ten seconds.

The image abnormality information generation unit 22G estimates variation in the image representations of the exterior of the vehicle body on the basis of the captured image to generate image abnormality information.

The image abnormality information generation unit 22G estimates variation in the image representation of the exterior of the vehicle body by estimating the difference between the captured images extracted by the image analysis unit 22C. Then, the image abnormality information generation unit 22G generates information in a region where the difference between the captured images, which are results obtained by the analysis in the image analysis unit 22C, is equal to or larger than a threshold. This information is used as the image abnormality information indicating an abnormal part. Thus, the image abnormality information generation unit 22G generates the image abnormality information indicating the abnormal part, for example, such as a damaged part of the vehicle 10 or a candidate for damaging substances to the vehicle 10, which is included in the captured image. The damaged part of the vehicle 10 is, for example, a portion damaged by a scratch or a dent on the exterior of the vehicle body.

The damage determination unit 22H determines the presence or absence of damage in the vehicle body of the vehicle 10 on the basis of both the vehicle-body abnormality information and the image abnormality information. In the present embodiment, the damage determination unit 22H determines the presence or absence of damage by comprehensively considering the difference between the captured images and the sound information and acceleration information included in the vehicle-body abnormality information.

In one example, the damage determination unit 22H determines that there is damage upon detecting a plurality of matched abnormalities, for example, in the case where the video-recording determination unit 22F detects an approaching object and determines that damage is likely to occur and the case where the acceleration is sensed and the difference between the captured images before and after sensing the acceleration is extracted.

Moreover, the damage determination unit 22H can determine that there is damage so long as even one abnormality is determined to be a significant abnormality. An example of the determination that there is damage can include the case of sensing a considerable acceleration exceeding a first acceleration sensing threshold that is larger than a second acceleration sensing threshold even if there is no detection of difference between the captured images. The first and second acceleration sensing thresholds are a target of acceleration sensing.

Moreover, the damage determination unit 22H determines whether or not there is a frame in which the door of another vehicle next to the vehicle 10 hits the vehicle 10 on the basis of a captured image including the movement of the door. The frame means a captured image for one frame. Then, the damage determination unit 22H can determine that there is damage in the case where there is the frame in which the door of another vehicle hits the vehicle 10. In addition, the damage determination unit 22H can determine that there is damage only when there is a difference exceeding a threshold in the image representation of the vehicle before and after the collision that is included in the captured image.

Moreover, in the present embodiment, the description is given of an exemplary case where the image analysis unit 22C extracts the difference in the image and the image abnormality information generation unit 22G generates the image abnormality information such as scratches in a normal state whether the still image capturing by frame-dropping or the moving image capturing in the vehicle monitoring apparatus 20. Then, the damage determination unit 22H determines the presence or absence of damage on the basis of the image abnormality information and the vehicle-body abnormality information. However, in the case of an event in which at least one of acceleration or sound exceeding a threshold is sensed, the image analysis unit 22C can extract the difference in images between the captured images before and after the event. Then, the damage determination unit 22H can determine that there is damage in the case where there is a difference exceeding the threshold.

Moreover, scratches on the vehicle 10 during parking are rarely point-shape, but they are often linear scratches or surface dents. Thus, the damage determination unit 22H can determine that the vehicle body is scratched and that there is damage in the case where the number of pixels with a difference in pixel units exceeding a threshold exceeds a predetermined number.

Moreover, the position of the scratch is fixed, so even if there is a difference caused by the variation in positions of the shadow of a structure on the vehicle body, it can be determined that there is no scratch if the spots where the difference occurs can be found out to be moved. Thus, in this case, the damage determination unit 22H can determine that there is no damage on the basis of the movement of the position where the difference occurs. Moreover, any image processing technique can be used to determine the presence or absence of scratches.

In this regard, in the present embodiment, the cameras 11 (cameras 11R, 11L, 11F, and 11B) attached to the vehicle 10 each have a visual field range of approximately 190° as described with reference to FIG. 4. Thus, the image abnormality information generation unit 22G is capable of generating the image abnormality information about the portion reflected in the visual field range 50 of the camera 11 in the exterior of the vehicle body of the vehicle 10. In addition, the acceleration sensor 13 is a 3-axis acceleration sensor and is capable of sensing the acceleration variation of the vehicle body of the vehicle 10 in each of the front-rear, left-right, and up-down directions as described above.

The acceleration sensed from the parked vehicle 10 is due to an external force because the parked vehicle 10 does not accelerate by itself. The acceleration can be observed as a waveform, and so the collision with an object creates a sharp spike-shaped waveform, and pressing by hand creates a gentle waveform. Thus, in one example, in the case where the door of another vehicle stopped on the left side of the vehicle 10 vigorously hits the vehicle 10, the acceleration sensor 13 is capable of sensing the acceleration from the left side of the vehicle 10 in the form of a sharp spike-shaped waveform.

Moreover, in the present embodiment, the vehicle 10 is provided with a plurality of the sound sensors 12 (microphones 12A, 12B, 12C, and 12D) as described with reference to FIG. 4. These respective sound sensors 12 are arranged at different positions from each other. Thus, in the case where the respective of sound sensors 12 receive sound or noise, it is possible to predict the direction in which the sound is coming on the basis of a time difference of the time points when the sound is received. In one example, if any sound or noise is emitted from the left door of the vehicle 10, the sound received by the microphone 12B has an earlier timing than the sound received by the microphone 12A, so it can be discriminated that the sound comes from the left. In addition, the sound sensor 12 provided at the rear of the vehicle 10, like the microphones 12C and 12D, makes it possible to predict the arrival direction of the sound emitted from the vehicle 10 in the front-rear direction. In other words, the sound sensor 12 provided at the rear makes it possible to discriminate between the case where the door of another vehicle stopped on the left side of the vehicle 10 collides with the rear door of the vehicle 10 and the case where the door of the other vehicle hits the front door of the vehicle 10.

Thus, upon detecting a scratch on the left door of the vehicle 10 with the captured image, if acceleration or sound from the left is sensed, the damage determination unit 22H can determine that there is direction matching or time matching through multiple sensing results. Moreover, everything does not necessarily match. In one example, even if there is no abnormality in the captured image, the damage determination unit 22H can determine that there is damage if there is a matching of direction or timing with respect to acceleration and sound. There is a part of the vehicle body that is not captured by the camera 11. Thus, it is not preferable that the damage determination unit 22H determines that there is no damage only because there are no scratches on the captured image.

Examples of another matching combination include a case where the door of another vehicle parked on the left side of the vehicle 10 is pressed against the vehicle 10 to cause a dent. In this case, the sensing of acceleration and the abnormality in the image match with each other, whereas the noise at a level that can be sensed upon being pressed is not output in some cases. Furthermore, examples of still another matching combination include a case where the left door of the vehicle 10 is scratched with a metal piece. In this case, the sound sensor 12 senses the scratched noise, and the scratched noise is also sensed in the captured image, but the acceleration at a level that can be sensed by the acceleration sensor 13 does not occur.

Note that the direction that can be sensed by the sound sensor 12 or the acceleration sensor 13 is not as precise as the position of an abnormal part such as a scratch that can be identified by image processing. Thus, if the direction sensed by the sound sensor 12 or the acceleration sensor 13 is substantially the same to the direction sensed using the captured image, the damage determination unit 22H can broadly determine that the directions match. In addition, for the time matching, similarly, the damage determination unit 22H can perform a wide range of determination as to whether the matching is made or not, in consideration of the sensing delay of the sound sensor 12 or the acceleration sensor 13 or the time interval of signal processing. In one example, the camera 11 captures an image by frame-dropping while the vehicle 10 is parked. Thus, the damage determination unit 22H can determine that the matching is made if acceleration or abnormal noise is sensed at the timing between the captured images of two frames having a difference in image representations of the vehicle body. In addition, the damage determination unit 22H can determine the presence or absence of the matching by setting one frame before and after the error within the error range.

Moreover, the damage determination unit 22H is more likely to determine that there is damage in the case where at least one of first and second conditions described below is satisfied than in the case where neither the first nor the second condition is satisfied.

The first condition is a condition based on the matching between at least two of the acceleration sensing time by the acceleration sensor 13, the sound sensing time by the sound sensor 12, and the image abnormality information detection time. The second condition is a condition based on the matching between at least two of the direction of the acceleration sensed by the acceleration sensor 13, the direction of the sound sensed by the sound sensor 12, and the direction of the damaged part of the vehicle body where the image abnormality information is detected.

In this regard, when an event occurs in which an acceleration exceeding a threshold is sensed or a sound exceeding the threshold is sensed, the vehicle body of the vehicle 10 is likely to be damaged. Thus, upon the occurrence of such an event, the video-recording determination unit 22F initiates recording of a moving image, the damage determination unit 22H determines that there is damage, or the damage reporting unit 22J reports the damage to at least one of the accident reporting server 30 or the victim mobile devices 44 as described later. However, if the sensed acceleration or sound is due to, for example, the operation noise of mechanical parking lot facilities or a natural phenomenon such as a storm, unnecessary video-recording can be performed or the user can be cumbersome, which causes disadvantages.

In consideration of the above, the vehicle monitoring apparatus 20 estimates the presence or absence of matching between the acceleration sensing, sound sensing, and image abnormality information detection. There is the case where neither the first condition nor the second condition is satisfied, that is, the case where no direction matching or time matching. In this case, by raising a sensing threshold level of the event, the vehicle monitoring apparatus 20 can make an adjustment such that an action of initiating video-recording of moving images or an action of giving notification to the victim mobile device 44 is not likely to occur.

In one example, a case is considered in which only one of the acceleration or the sound exceeding a threshold is sensed, and the difference in images is not detected. In this case, the vehicle monitoring apparatus 20 can additionally perform control to raise a threshold level for determining the acceleration or sound used as an event determination. In addition, in this case, it is preferable to further additionally perform control to recover the threshold to the original when the sensed acceleration or sound level returns to normal.

Moreover, the damage determination unit 22H determines that there is no damage even if the video-recording determination unit 22F determines that the video-recording is to be performed in some cases. Thus, it is preferable that the video-recording determination unit 22F is more likely to determine not to perform the video-recording in the case in which the number of determination mismatches is equal to or larger than a predetermined number of times than in the case where the number of determination mismatches is less than the predetermined number of times. The determination mismatch occurs in the case where the video-recording determination unit 22F determines to perform the video-recording but the damage determination unit 22H determines that there is no damage. This predetermined number of times is only required to be predetermined in consideration of the storage capacity or power consumed by unnecessary video recording.

The damage-reporting image generation unit 22I will be described.

The damage-reporting image generation unit 22I generates a damage-reporting image capturing the exterior of the vehicle body as viewed from a virtual viewpoint outside the vehicle on the basis of the vehicle-body abnormality information or the image abnormality information and the captured image.

The damage-reporting image generation unit 22I generates the damage-reporting image in the case where the damage determination unit 22H determines that there is damage. Moreover, the generation of the damage-reporting image can be performed by a functional block having an image processing function. Thus, in one example, the image analysis unit 22C can generate the damage-reporting image.

Figure 6A:
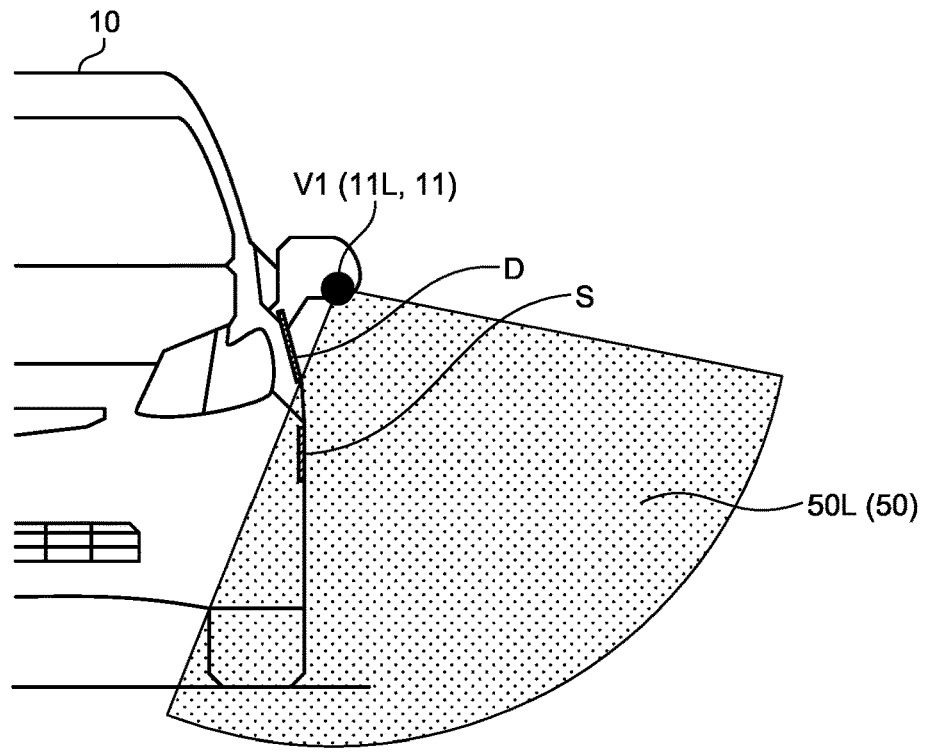
FIG. 6A is a diagram illustrated to describe the generation of a damage-reporting image according to the embodiment.
Figure 6B:
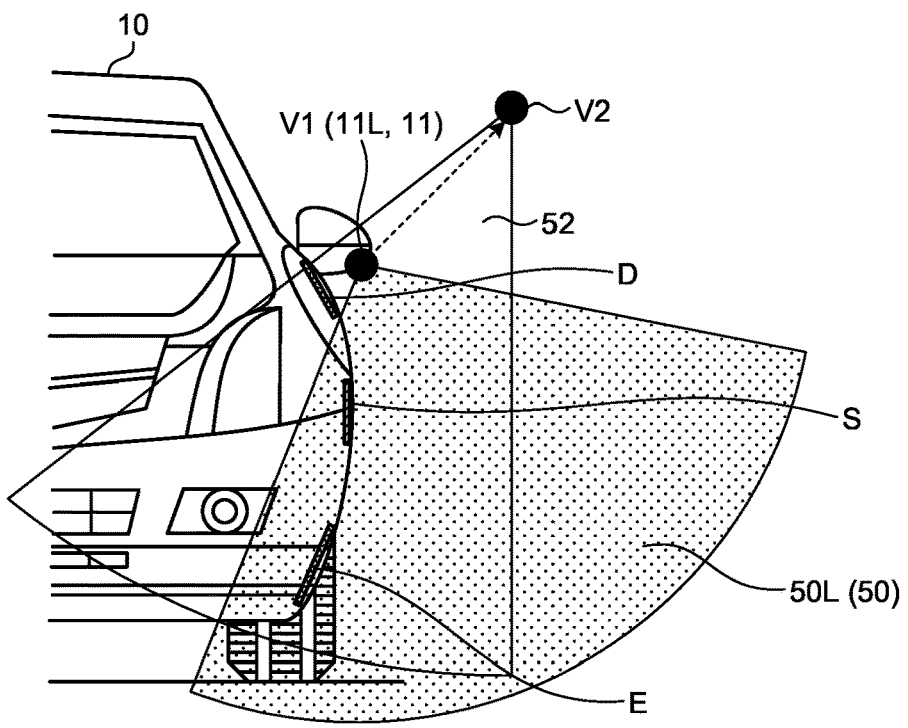
FIG. 6B is a diagram illustrated to describe the generation of a damage-reporting image according to the embodiment.

FIGS. 6A and 6B are diagrams illustrated to describe the generation of the damage-reporting image. As illustrated in FIG. 6A, the camera 11 performs the image capturing to obtain a captured image including an image representation of the exterior of the vehicle body of the vehicle 10. In one example, the captured image captured with the camera 11L has a visual field range 50L with a camera viewpoint V1 of the camera 11L set as a viewpoint.

The camera viewpoint V1 has a lower viewpoint than the position of the eyes of a person who stands on the side of the vehicle 10 to try to check the damage to the exterior and is significantly close to the vehicle. Thus, it may be difficult to understand the correspondence between an image captured from the camera viewpoint V1 and an image representation viewed by the eyes of the person standing outside the vehicle 10. Thus, the damage-reporting image generation unit 22I shifts the camera viewpoint V1 to a virtual viewpoint V2 located outside the vehicle as illustrated in FIG. 6B and generates an image corresponding to an image representation of the damaged part of the vehicle 10 viewed by a person from the virtual viewpoint V2. In other words, the damage-reporting image generation unit 22I generates, as the damage-reporting image, an image of a visual field range 52 having the virtual viewpoint V2 that is set as the viewpoint and shifted to the outside and upward of the vehicle 10. Upon shifting the viewpoint from the camera viewpoint V1 to the virtual viewpoint V2, for example, a scratch S located in the middle of the door is enlarged and displayed in the vertical direction on the damage-reporting image, making it easy to check.

However, for the captured image captured by the camera 11, for example, the camera 11L installed in the side-view mirror, the upper part of the door is a blind spot outside the visual field range 50L of the camera 11L if the vehicle 10 has a vehicle body shape as illustrated in FIG. 6A. Thus, a portion D on the upper side of the door is not shown in the captured image of the camera 11L. In addition, if a vehicle has a door with a round overhanging part in the middle as illustrated in FIG. 6B, this overhanging part hides a portion E on the lower side of the door, and so the portion E is not shown in the captured image by the camera 11L. The portion D on the upper side of the door or the portion E on the lower side of the door among blind spots that are not shown in the image captured from the camera viewpoint V1 is within the visual field range 52 with the virtual viewpoint V2 set as a starting point. Thus, it is necessary to display some image representations on the damage-reporting image. It is possible to supplement a blind spot that is not shown in such a captured image but is displayed in the damage-reporting image with an image representation synthesized from the 3D model of the vehicle body. However, if an image representation of an actual vehicle is replaced with an image representation of a 3D model with no scratch that is difficult to distinguish, there is a possibility of making a wrong determination that there are no scratches on the blind spot. In consideration of this issue, in the image processing executed by the damage-reporting image generation unit 22I, the blind spot portion, which is not shown in the captured image, is represented with an alternative image that is not misunderstood as an actual image in the form of an image representation of a wire-frame model of the vehicle body, an image representation of the 3D model colored in a color different from the color of the vehicle body, or the like. Additionally, in this image processing, an image obtained by transforming the viewpoint of the captured image is incorporated in the portion that is shown in the captured image.

Generation of the damage-reporting image will be described in detail. The damage-reporting image generation unit 22I generates the damage-reporting image by transforming a projection image obtained by projecting the captured image onto a projection plane corresponding to a surface of the vehicle body into a viewpoint-transformed image as viewed from the virtual viewpoint V2. In other words, the damage-reporting image generation unit 22I generates the damage-reporting image using the projective transformation and the viewpoint shifting from the camera viewpoint V1 to the virtual viewpoint V2.

The direction of the virtual viewpoint V2 upon the generation of the damage-reporting image by the damage-reporting image generation unit 22I approximately coincides with at least one of the direction of the acceleration sensed by the acceleration sensor 13, the direction of the sound sensed by the sound sensor 12, and the direction indicating abnormality indicated by the image abnormality information. The horizontal distance from the vehicle body to the virtual viewpoint V2 and the height of the virtual viewpoint V2 relative to the ground are set on the presumption of the viewpoint position when a person with a standard physique standing between the own vehicle and a vehicle parked next to the own vehicle looking into the side of the vehicle body in a parking lot where parking spaces are lined up in parallel, for example, when damage to the side surface of the vehicle body is detected. The standard physique differs depending on gender, country, or region, but for example, the horizontal distance from the vehicle body to the virtual viewpoint V2 can be set to 30 centimeters (cm), and the height of the virtual viewpoint V2 relative to the ground can be set to 150 cm.

Figure 7:
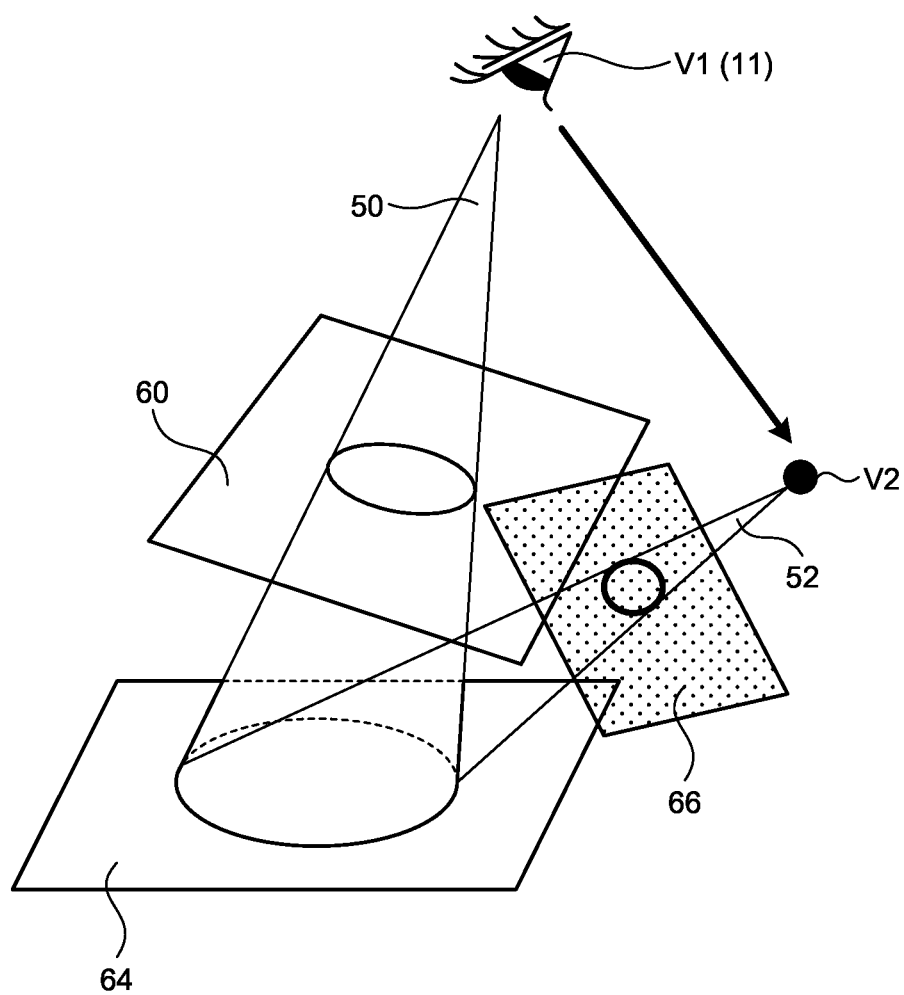
FIG. 7 is a diagram illustrated to describe projective transformation and viewpoint shifting according to the embodiment.

FIG. 7 is a diagram illustrated to describe an example of projective transformation and viewpoint shifting. The image capturing performed by the camera 11 causes the three-dimensional space to be transformed into a captured image 60 that is a two-dimensional image viewed from the camera viewpoint V1. Projection is to project a two-dimensional image onto another surface, and any projection can be used so long as the operation of a projector that projects a slide image is visualized onto a screen.

The damage-reporting image generation unit 22I projects the captured image onto a projection plane 64. The projection plane 64 on which the captured image is projected can be either a flat surface or a curved surface. If the projection plane 64 is tilted with respect to the viewpoint, the image representation is stretched, and when it is projected onto a curved surface, the image is deformed. The processing of associating pixels on the captured image with pixels on the projection plane 64 is referred to as mapping. Transforming the projection plane 64 from the camera viewpoint V1 to an image viewed from the virtual viewpoint V2, which is another viewpoint, is referred to as viewpoint transformation. In addition, the image obtained by the viewpoint transformation is referred to as a viewpoint-transformed image 66. In the images on the projection plane 64, the part where the distance to the viewpoint is shortened by the viewpoint transformation is enlarged on the viewpoint-transformed image 66, and the part where the distance to the viewpoint is increased by the viewpoint transformation is reduced on the viewpoint-transformed image 66. In other words, the image is also deformed by the viewpoint transformation.

It is also possible to perform mapping (deformation) that directly associates pixels on the captured image with pixels on the viewpoint-transformed image 66, instead of performing sequentially the projection and the viewpoint transformation. The processing of deforming the captured image to obtain the viewpoint-transformed image 66 is referred to as viewpoint shifting regardless of whether the processing performs two steps or one step. The projection, the viewpoint transformation, and the viewpoint shifting can be executed with the processing of deforming the image using a mapping table.

The damage-reporting image generation unit 22I obtains the viewpoint-transformed image 66 from the captured image by the viewpoint shifting processing described above.

The viewpoint shifting from the camera viewpoint V1 to the virtual viewpoint V2 is "virtual viewpoint shifting". Thus, the same image as the one actually captured by shifting the viewpoint is failed to obtain. In other words, the image representation corresponding to the portion that has been the blind spot at the camera viewpoint V1 is failed to obtain even if the viewpoint is shifted to the virtual viewpoint V2.

Figure 8:
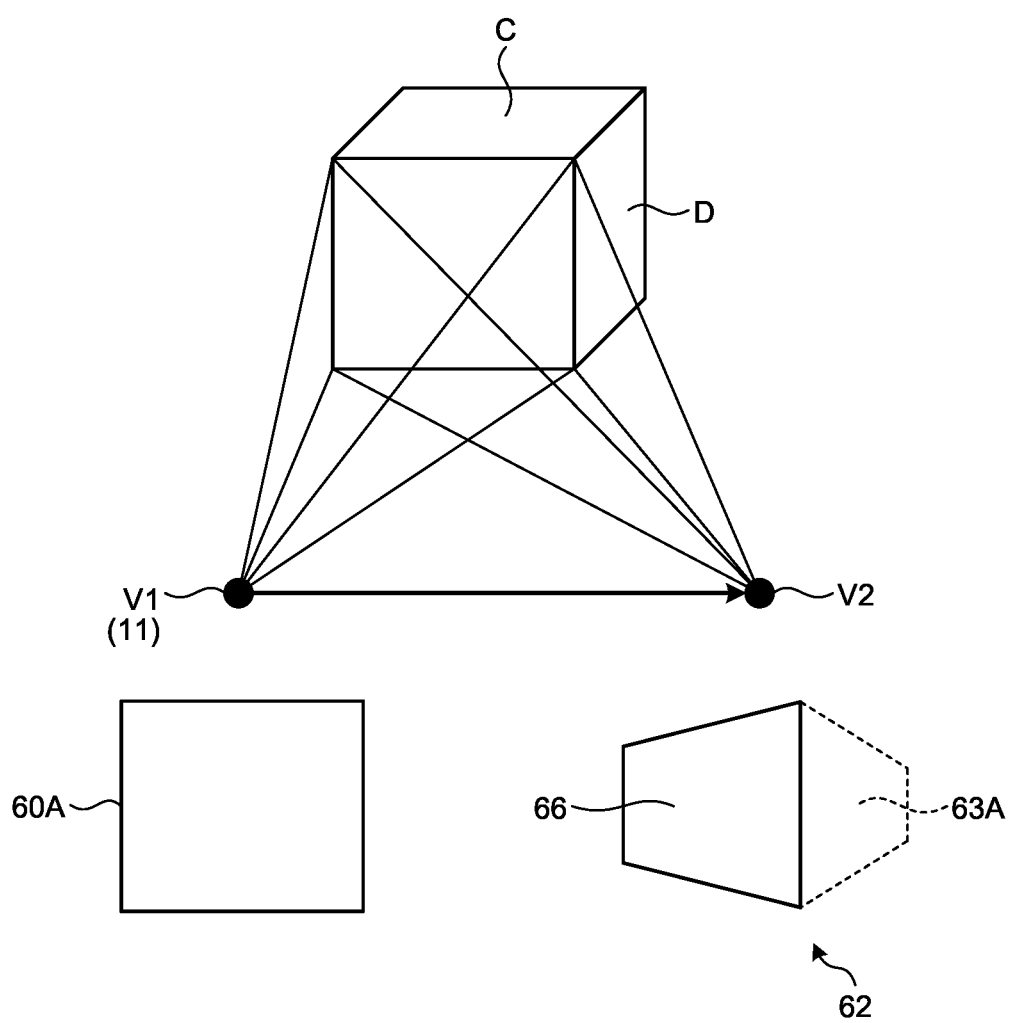
FIG. 8 is a diagram illustrated to describe the blind spot processing according to the embodiment.

FIG. 8 is a diagram illustrated to describe the blind spot processing. In one example, a case is considered in which an image 60A is transformed into the viewpoint-transformed image 66 by the viewpoint shifting to the virtual viewpoint V2. The image 60A has a squire shape and is obtained by capturing a cube C from the front camera viewpoint V1. The viewpoint-transformed image 66 is obtained, for example, by virtually capturing the cube C from an oblique direction. In this case, a side plane D of the cube C is a blind spot upon being captured from the camera viewpoint V1 and is not shown in the captured image. Thus, upon mapping the captured image to the viewpoint-transformed image 66, there is no pixel to be mapped on the side plane D that is a blind spot. Thus, in a case where the subject is known to be the cube C, the side plane D as a blind spot is supplemented with 3D data to generate the viewpoint-transformed image 66 such that a side plane 63A is present. FIG. 8 illustrates an example in which the side plane 63A of the cube C is complemented with a wire-frame and a plane.

Figure 9A:
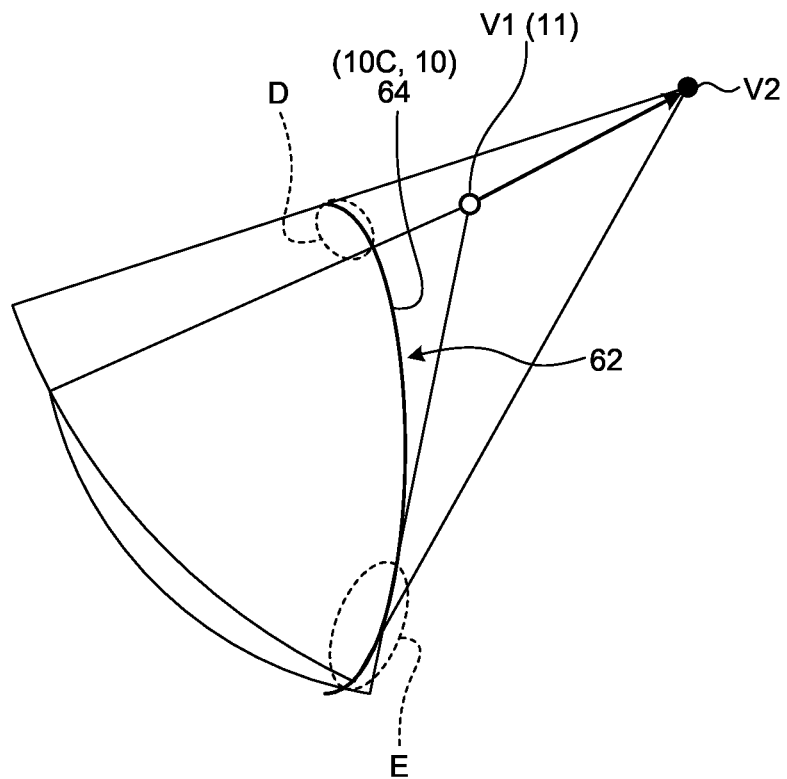
FIG. 9A is a diagram illustrated to describe the blind spot processing according to the embodiment.

FIG. 9A is a diagram illustrated to describe an example of blind spot processing of a damage-reporting image 62. The damage-reporting image generation unit 22I projects the captured image onto the projection plane 64 and, generates, on the projection plane 64, the damage-reporting image 62 in which a region in the projection plane where the captured image is not projected is replaced with an alternative image having a form different from a projection region where the captured image is projected.

The description is given of an example of a side surface 10C of the door of the vehicle 10 for facilitation of illustration. In addition, FIG. 9A illustrates the shape of the side surface 10C of the door in a simplified form. The projection plane 64 on which the captured image obtained from the camera viewpoint V1 is projected is a 3D model having the shape of the side surface 10C of the door. Matching the projection plane 64 with the real object makes it possible to prevent deformation due to the projection.

In the captured image, the portion D on the upper side of the door is a blind spot because of being out of the field of view of the camera 11, and the portion E on the lower side of the door is a blind spot because of being behind the overhanging part of the door. The image viewed from the virtual viewpoint V2 looks like an image viewed from the outside of the door, so it is necessary to show the upper and lower portions of the door as well.

Figure 9B:
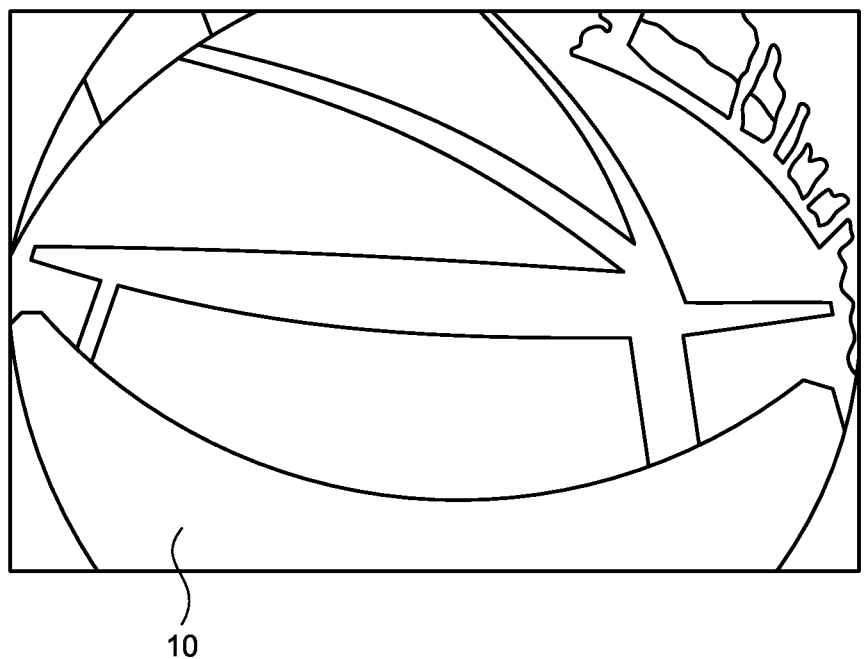
FIG. 9B is a diagram illustrating a captured image captured from a camera viewpoint according to the embodiment.

Thus, in the present embodiment, the damage-reporting image generation unit 22I maps the captured image to the projection plane 64, which is a 3D model of the exterior of the vehicle 10. FIG. 9B is an example of a captured image that is captured from the camera viewpoint V1. The captured image illustrated in FIG. 9B is captured with a camera equipped with a fisheye lens, so the side surface of the vehicle 10 is shown in a largely distorted form. The damage-reporting image generation unit 22I maps the captured image to the projection plane 64. An image captured with a fisheye lens is typically subjected to processing of correcting distortion before it is displayed, but the processing of correcting distortion is also performed by mapping. Thus, it is possible to perform the distortion correction and the projective transformation in one-step mapping. In addition, the damage-reporting image generation unit 22I performs the blind spot processing to generate the damage-reporting image 62 that is synthesized so that an image representation of the wire-frame model of the exterior of the vehicle 10 can be viewed as an alternative image without mapping to the portions D and E that are blind spots.

Figure 10:
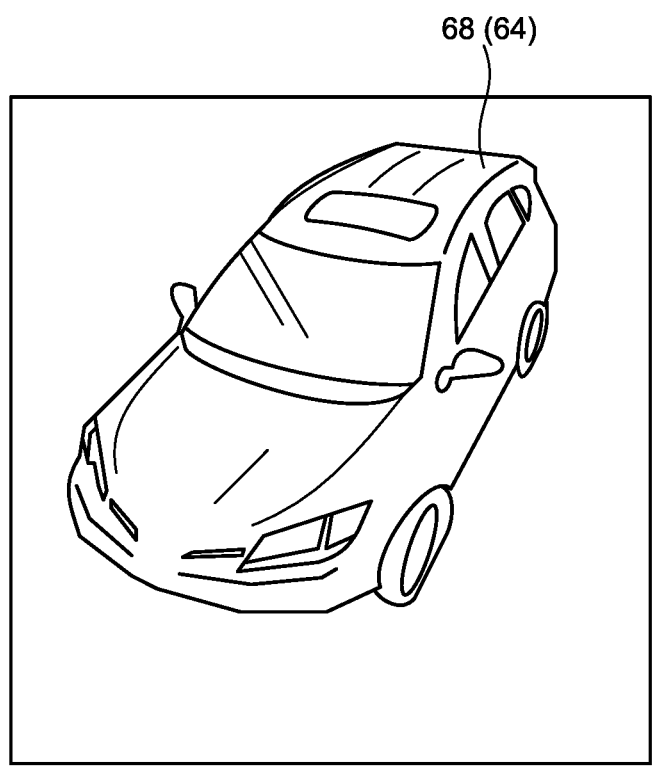
FIG. 10 is a diagram illustrated to describe a 3D model of a vehicle body used as a projection plane according to the embodiment.

FIG. 10 is a diagram illustrated to describe an example of the 3D model 68 of the vehicle body used as the projection plane 64. The damage-reporting image generation unit 22I uses the 3D model 68 as the projection plane 64 to generate the damage-reporting image 62.

Figure 11:
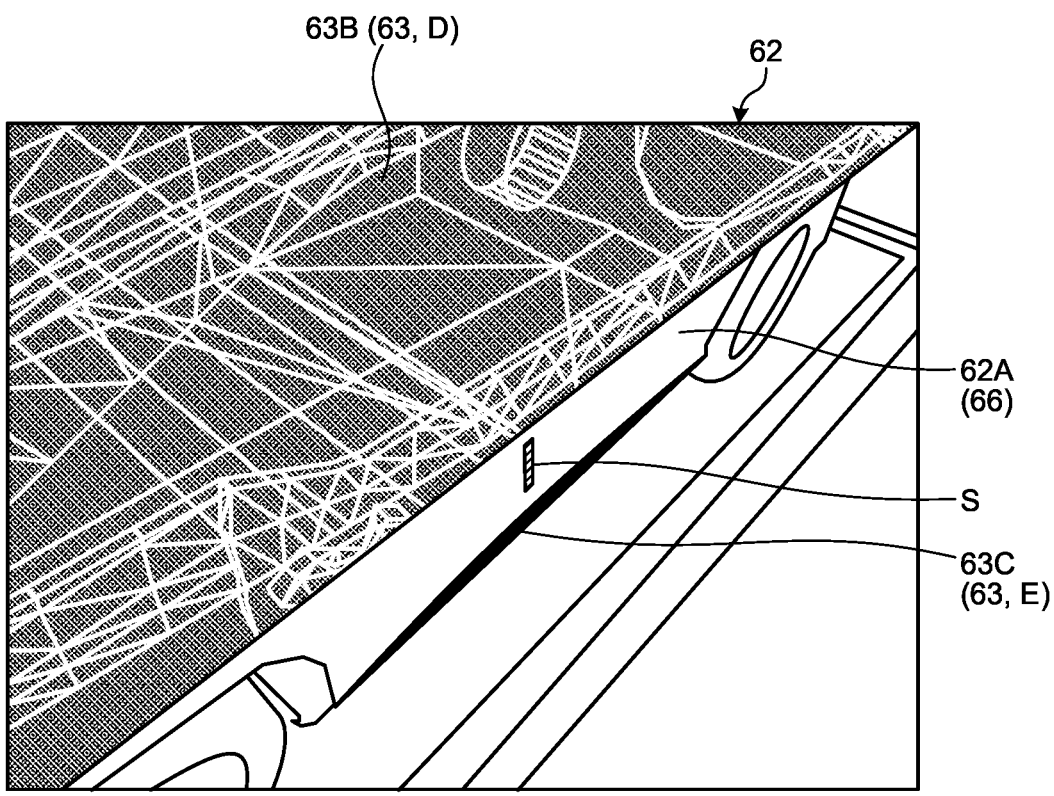
FIG. 11 is a schematic diagram of a damage-reporting image according to the embodiment.

FIG. 11 is a schematic diagram of an example of the damage-reporting image 62. As illustrated in FIG. 11, the damage-reporting image 62 is an image of a vehicle body of the vehicle 10, which is viewed from the virtual viewpoint V2 as the shifted viewpoint. The damage-reporting image 62 includes a projection region 62A in which a captured image that is an actually photographed image illustrated in FIG. 9B is projected and an alternative image area 63 in which a blind spot portion is replaced with an alternative image. FIG. 11 illustrates an example in which an upper blind spot portion (63, D) of the vehicle body is replaced with an image representation 63B of the wire-frame model as an alternative image and a lower blind spot portion (63, E) of the vehicle body is replaced with an image representation 63C of a 3D model colored in a color different from an actual vehicle body color shown in the projection region 62A. Moreover, the alternative image is not limited to the image representation of the wire-frame model of the vehicle body and the image representation of the 3D model colored in a color different from that of the vehicle body, and can be, for example, an image in which the blind spot portion is colored in black.

The damage-reporting image 62 is intended to make it easier for the user of the vehicle 10 to check the damage without returning to the vehicle 10. In addition, upon returning to the vehicle of the user, the damage-reporting image 62 is intended to make it easier for the user to check the correspondence between the damage-reporting image 62 and the actual scratch S of the vehicle body and the correspondence between the damage-reporting image 62 and a captured image captured by a perpetrator. Thus, the damage-reporting image generation unit 22I generates the damage-reporting image 62 that is close to its appearance by shifting the viewpoint by considering a viewpoint position of the user upon returning to the vehicle 10. The position of the scratch S on the damage-reporting image 62 is the same as the actual scratch on the vehicle body, and a structure that is not shown in the captured image of the vehicle body is also displayed. Thus, the position of the scratch S can be relatively noticeable.

The damage-reporting image generation unit 22I may generate the damage-reporting image 62 in which an abnormal part indicated by the image abnormality information is highlighted. The scratch S is an example of the abnormal part. In one example, the damage-reporting image generation unit 22I can add highlighting processing such as surrounding the position of the scratch S detected by the difference in the images with a frame so that the scratch S can be easily found in the damage-reporting image 62. In addition, in a case where the user of the vehicle 10 gives an operation instruction to an area on which this frame is displayed, techniques of enlarging the image in the frame, increasing the contrast to easily found the scratch S, or the like can be used.

The description continues referring back to FIG. 3. The damage reporting unit 22J reports a damage report including the captured image or the image generated on the basis of the captured image to an information processing apparatus outside the vehicle 10 in accordance with a damage determination result obtained by the damage determination unit 22H. Specifically, the damage reporting unit 22J transmits the damage report to the information processing apparatus via the communication control unit 22K, the input/output unit 21, the communication device 14, and the public network N. The information processing apparatus that reports the damage report is at least one of the accident reporting server 30 or the victim mobile device 44.

In the present embodiment, the damage reporting unit 22J reports the damage report including the damage-reporting image 62 to at least one of the accident reporting server 30 or the victim mobile device 44.

In the present embodiment, the damage reporting unit 22J transfers the damage-reporting image 62 as a part of the damage report to one or both of the victim mobile device 44, which is the mobile device 40 carried by the user of the vehicle 10, and the accident reporting server 30. Moreover, as one embodiment, the vehicle monitoring system 1 can be provided not necessarily with the accident reporting server 30. In this case, the user (i.e., the victim) of the vehicle 10 checks the damage by looking at the damage-reporting image 62 and deals with the perpetrator by returning to the site of the vehicle 10. In this case, the user of the vehicle 10 is able to decide whether or not to return to the site of the vehicle by looking at the damage-reporting image 62. In addition, in the configuration in which the vehicle monitoring system 1 is provided with the accident reporting server 30, the image of the damaged part of the vehicle 10 captured by the perpetrator is to be transmitted to the accident reporting server 30 as a part of the accident report to the side of the perpetrator. However, in this configuration, the user of the vehicle 10 can download the image reported by the perpetrator from the accident reporting server 30, compare it with the damage-reporting image 62, determine whether the image reported by the perpetrator is appropriate or not, and respond to the accident reporting server 30. In this case, regardless of whether the image reported by the perpetrator is appropriate or not, it is possible to have a configuration in which the victim may be requested to capture the damaged part by oneself and to transmit the captured image to the accident reporting server 30, and then the accident reporting server 30 can determine whether the accident report is appropriate or not. In this manner, collating among the damage-reporting image 62 reported by the vehicle, the image reported by the perpetrator, and the image reported by the victim makes it possible to prevent a fraudulent claim such as forging accidents and aiming for fraudulent insurance claims.

Moreover, a device that first transmits the damage report to the victim mobile device 44 carried by the user of the vehicle 10 or the victim who is the user of the vehicle 10 can be either the accident reporting server 30 or the damage reporting unit 22J of the vehicle monitoring apparatus 20. In the case where the accident reporting server 30 transmits the damage report to the victim mobile device 44, the damage reporting unit 22J of the vehicle monitoring apparatus 20 transmits the damage report only to the accident reporting server 30 but does not transmit the damage report to the victim mobile device 44. The accident reporting server 30 can transmit the damage report received from the vehicle monitoring apparatus 20 to the victim mobile device 44. It is also possible to have a configuration in which the accident reporting server 30 estimates the damage-reporting image 62 and transmits the damage report to the victim mobile device 44 only upon agreeing to the damage report. There can be an exemplary case in which the received damage-reporting image 62 is not significantly different from the previously received damage-reporting image and the information about the sensed acceleration is specified to be due to the operation of mechanical parking lot facilities. In this case, it is possible to have a configuration in which the accident reporting server 30 blocks the damage report and does not transmit it to the victim mobile device 44 in such a way as not to unnecessarily bother the user of the vehicle 10. If a configuration is used in which the damage reporting unit 22J of the vehicle monitoring apparatus 20 transmits the damage report directly to the victim mobile device 44, the victim is able to respond to the situation faster, but the damage report is transmitted without being filtered by the accident reporting server 30. Thus, there can be cases where no abnormalities are found even if visiting the vehicle 10 at the site or the scratches found on the vehicle are ones that have existed before.

The accident report requesting unit 22L issues notification for requesting an accident report to the outside of the vehicle in accordance with the damage determination result obtained by the damage determination unit 22H. The notification for requesting the accident report includes a request for access to the accident reporting server 30.

Accordingly, in the present embodiment, in the case where the damage determination unit 22H determines that there is damage, that is, the exterior of the vehicle body is damaged, the vehicle monitoring apparatus 20 reports the result to one or both of the victim mobile device 44 carried by the victim who is the user of the vehicle 10 and the accident reporting server 30. In addition, at the same time as this report, the accident report requesting unit 22L of the vehicle monitoring apparatus 20 causes notification information including a uniform resource locator (URL) for the perpetrator to access the accident reporting server 30 to be displayed to urge the perpetrator to report the accident.

In the present embodiment, the description is mainly given of the vehicle monitoring system 1 with the configuration having the accident reporting server 30. However, it is possible to have a configuration in which the accident reporting server 30 may not necessarily be provided in the configuration of the vehicle monitoring system 1 so long as the victim that is the user of the vehicle 10 visits the site of the damaged vehicle to urge the perpetrator to report the accident. However, the latter will increase the burden on the user of the vehicle 10.

The details of the notification information are described. The accident report requesting unit 22L notifies as notification information any of a character string including a URL, a quick response (QR) code (registered trademark) including a URL, and a barcode including a URL. The accident report requesting unit 22L notifies the notification information by performing at least one of display of the notification information, display of a location to present the notification information, lighting of the location to present the notification information, guidance of a line of sight to the location to present the notification information, and output of sound indicating the location to present the notification information.

Such a URL is a URL of the accident reporting server 30. The access to the URL makes it possible to perform the reception of guidance on the accident report procedure, the transmission and reception of images, and the accident processing including insurance-related information.

Figure 12A:
FIG. 12A is a diagram illustrating a QR code including a URL according to the embodiment.
Figure 12B:
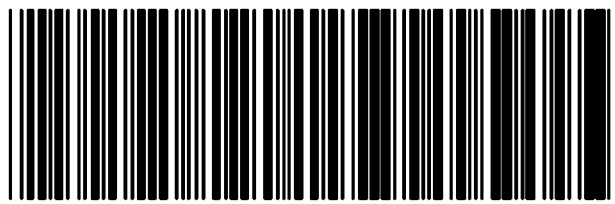
FIG. 12B is a diagram illustrating a barcode including a URL according to the embodiment.

FIG. 12A is a diagram illustrating an example of a QR code including a URL. FIG. 12B is a diagram illustrating an example of a barcode including a URL.

The accident report requesting unit 22L can perform notification for requesting access to the accident reporting server 30 to the outside of the vehicle. Means for achieving this are not limited to specific means. In one example, a plate on which a QR code including a URL is printed is placed in the interior of the vehicle 10. Then, the accident report requesting unit 22L, when determining that there is damage, can control lighting to illuminate the QR code or can control a speaker provided in the vehicle 10 so that the speaker output a sound requesting access to the accident reporting server 30. In addition, a translucent liquid-crystal display (LCD) panel or organic electroluminescence (EL) panel can be used as the external-mounting HMI 16. The external-mounting HMI 16 can be configured to be fitted into the vehicle window. Then, the accident report requesting unit 22L, when determining that there is damage, can cause a barcode including a URL to be displayed on the external-mounting HMI 16. In addition, the simplest presentation method can be a way in which a sticker printed with a two-dimensional code including a URL is attached in advance to a window or vehicle body of the vehicle 10, giving a sound instruction to read the code of the sticker with the mobile device.

In the present embodiment, the URL is uniquely provided for each vehicle 10. In one example, the insurance company that manages the accident reporting server 30 issues URLs different for each insurance contract. Thus, the URL notified by the vehicle 10 to the outside of the vehicle is different for each vehicle. Moreover, the insurance company can previously issue a URL for each vehicle 10 or can determine the URL on the basis of the contract number, time, or the like of the vehicle 10 upon the access by the vehicle 10 to the accident reporting server 30.

The URL can have a format such as "https://abc_hoken.co.jp/?No=1234&ID=report". Upon transmitting this URL, the accident reporting server 30 of "abc_hoken.co.jp" receives the parameters following the question mark "?" and determines that the vehicle with the contract number "1234" is requested to receive the accident report.

In this manner, the use of the URL different for each insurance contract makes it possible for the accident reporting server 30 to specify a contract number of the access source at the time when the URL is received. The insurance company registers the contractor's name and vehicle number upon making the insurance contract, so the accident reporting server 30 is capable of filling in the matters stated regarding the victim in the accident certificate even if there is no report from the victim side. The accident certificate certifies that an accident has occurred by adding matters that identify an accident. The accident certificate is issued by the Japan Safe Driving Center on the basis of a police record prepared by a police officer under the Japanese legal system at the time of filing of this application. In other words, police officers do not directly prepare accident certificates, and police do not issue accident certificates. However, the present application has nothing to do with the police system or the classification of related organizations. What victims or perpetrators want is not the preparation of police records but the issuance of accident certificates. Thus, in the present embodiment, in some cases, the description is made without considering the distinction between organizations or documents, such as preparation of accident certificates by a police officer or the issuance of accident certificates by police. Even in this case, such a description only uses expressions based on the feelings of the victims or perpetrators, so it would like to ask for understanding.

If the use of the system of the present embodiment allows the perpetrator to use the perpetrator mobile device 42 to access the notified URL and to be given with information about the matters to be stated of the perpetrator, all the information necessary to prepare an accident certificate is available. On the other hand, in the system in the related art, if the perpetrator voluntarily calls the police and tries to report the accident, sometimes the police tell the perpetrator to find the victim. This is because the preparation of the accident report requires the statements of both parties involved in the accident, and if the both parties appear at the police station, the police do not have to be dispatched to the accident scene. However, in the event of a collision with a parked vehicle, a user of the damaged vehicle is less likely to be present at the scene, and it is difficult to find the user even if trying to find, in the end, if the victim is not found, the perpetrator asks the police to be dispatched to the scene and waits for the arrival of the police officer. This can result in the perpetrator being stuck at the scene for a long time. The system described in the present application allows the perpetrator to give information about the matters to be stated of the perpetrator side to the accident reporting server 30 and the accident reporting server 30 to supplement and report the information about matters to be stated of the victim side to the police. Such a system eliminates the need for the perpetrator to search for the victim, meeting the obligation to report to the police if the perpetrator has reported to the accident reporting server 30. Thus, the perpetrator can leave the accident scene. In other words, a significant reduction in the burden on the perpetrator is effectively achieved, and moreover, it is not necessary for the perpetrator to come into contact with the victim or for the perpetrator to know the victim's personal information. Thus, personal information is effectively protected.

Moreover, when the victim returns to the vehicle 10, it is only required to check that the report from the perpetrator, especially the damage-reporting image 62 of the damaged vehicle, is not different from the actual damage, so there is no need to return to the vehicle 10 in a hurry. Instead, the victim is able to avoid situations in which the victim comes into contact with the perpetrator or gets the face to be known due to waiting until the perpetrator finishes reporting and returning to the site of the vehicle 10. Thus, it is possible to avoid getting involved in troubles between personal parties.

In this manner, the use of URLs different for each contract number makes it possible to reduce the time and psychological burden on both the perpetrator and the victim and to protect personal information.

Moreover, the vehicle 10, the perpetrator mobile device 42, the victim mobile device 44, and the police officer mobile device 46 access the accident reporting server 30. Thus, the parameters following the question mark "?" in the URL can be individually set differently for each type of caller so that it is possible to discriminate who the caller of the access source is. In one example, the parameters following the question mark "?" in the URL are only required to be set as follows.

"?No=1234&ID=car" for the vehicle 10
"?No=1234&ID=report" for the perpetrator mobile device 42 carried by the perpetrator
"?No=1234&ID=owner" for the victim mobile device 44 carried by the victim
"?No=1234&ID=police&PW=**" for the police officer mobile device 46 carried by the police officer In one example, presuming that an application for the owner of the vehicle 10** is downloaded using the QR code displayed on an insurance policy. In this case, it is only required that this application accesses "https://abc_hoken.co.jp/?No=1234&ID=owner".

Moreover, an e-mail to be sent by the accident reporting server 30 to the police can include a URL for police, and special authority can be given to the access by the URL, and approval can be requested after checking the data including the personal information of the perpetrator and the victim. The password is attached to the URL for police to prevent leakage or falsification of personal information due to unauthorized access. Thus, it is preferable to set different passwords for each accident so that the URL with special authority is not inferred.

Moreover, the notification for requesting an accident report can include notification indicating the personal information protection policy. In addition, the notification for requesting an accident report can include notification for requesting transmission of a driver's license or a photograph of the related vehicle.

The notification for requesting an accident report that includes the notification for requesting the transmission of a driver's license or a photograph of the related vehicle makes it possible for the perpetrator mobile device 42 carried by the perpetrator that accesses the accident reporting server 30 on the basis of the notification to efficiently provide the accident reporting server 30 with information necessary to prepare the accident certificate. In addition, the accident reporting server 30 is capable of acquiring the information necessary to prepare the accident certificate, for example, a subscriber number (e.g., telephone number) of the mobile device from the perpetrator mobile device 42 carried by the perpetrator. However, it is desirable to ask for the consent of the perpetrator at the stage of acquiring information from the perpetrator mobile device 42 or at the stage of transmitting the information to the accident reporting server 30.

Moreover, the notification for requesting an accident report can include a message to convey to the perpetrator.

The message to be conveyed to the perpetrator can be, for example, a sound as follows: "The parties involved in the accident are obliged to report to the police. You can report to the police using the insurance company's reporting agency service by reading the QR code posted on the back window and accessing the URL. The personal information you entered will only be disclosed to police and insurance company, not to victims.".

The access to the URL by the perpetrator mobile device 42 causes a message below to be displayed on a UI unit 40B of the perpetrator mobile device 42.

The message displayed upon accessing the URL is, for example, "Download the application to enter the information to be reported to the police. The size of the application is XX MB. Do you agree to the download?". The application is an accident reporting application.

Upon downloading and running the accident reporting application to the perpetrator mobile device 42, the accident reporting application hands over the subsequent processing. In one example, the accident reporting application activates a camera 40F of the perpetrator mobile device 42, causes a camera image with a frame to be displayed on the UI unit 40B, and causes the following messages to be displayed sequentially.

1: "Please allow accessing and sending your location information."
2: "Please allow accessing and sending your phone number and email address."
3: "Please allow using images taken from now to report to the police."

4: "Please take a picture of your driver's license to fit within the frame."

5: "Please take a picture of your automobile liability insurance certificate to fit within the frame."

6: "The damaged vehicle is reporting the collision with the vehicle's right side. Please take a picture of the entire right side of the damaged vehicle to fit within the frame."

7: "Please take a close-up picture of the damaged vehicle."

8: "Please take a close-up picture of the collision part of your car."

9: "You can leave the scene because you have reported to the police. We are sending an e-mail requesting that you take a certificate of voluntary insurance, so please respond after returning home."

Note that the messages mentioned above are an example. A message asking to send a photograph of the license plate of the perpetrator's vehicle or a photograph of the perpetrator's own face can be added, and the wording of the messages can be changed.

The operation of the perpetrator mobile device 42 by the perpetrator who operates the perpetrator mobile device 42 following the displayed message makes it possible to transmit accident certification information that is various types of information of the perpetrator necessary to prepare the accident certificate to the accident reporting server 30 with ease.

The role of the accident reporting application downloaded to the perpetrator mobile device 42 in the vehicle monitoring system of the present application is to simplify reporting to the police and reduce the burden on the perpetrator.

If it is known that the accident report agency service, which is a part of the vehicle monitoring system of the present application, can be easy to use, it is possible to reduce the number of hit-and-run cases caused by feeling cumbersome of the reporting and leaving the accident scene. In addition, if it is shown in business that the vehicle 10 that can use the accident report agency service is more likely to obtain compensation from the perpetrator side, it is possible to increase the sales performance of the vehicles 10 provided with the vehicle monitoring apparatus 20 of the present embodiment.

Moreover, the use of the accident reporting application for causing to read the matters stated in the accident certificate from the image makes it possible to substantially finish the reporting work of the perpetrator just by performing the image capturing. The optical character recognition (OCR) processing for reading character information from an image can be performed on the side of the accident reporting server 30, but the OCR processing can be performed on the side of the accident reporting application, and textual information, instead of an image, can be transmitted to the accident reporting server 30. The latter can reduce communication costs and shorten the reporting work time.

Moreover, the perpetrator is necessary to capture an image of the damaged vehicle. However, the victim vehicle can be captured from the same angle as the damage-reporting image 62 by causing the damage-reporting image 62 transmitted by the damaged vehicle to be displayed by the accident reporting application. In this manner, matching the image-capturing angles makes it possible to check the validity of the image indicating the damage reported by the perpetrator more easily.

The accident reporting server 30 will be described. The control unit 30D of the accident reporting server 30, when receiving the damage report from the vehicle monitoring apparatus 20 of the vehicle 10 via the public network N and the communication unit 30A, initiates the accident reporting processing.

As described above, the vehicle monitoring apparatus 20, when determining that there is damage, reports the damage report to the accident reporting server 30 and notifies the accident reporting server 30 of the notification information including the URL of the accident reporting server 30. In the case where the perpetrator accesses the URL using the perpetrator mobile device 42, the accident reporting server 30 causes the perpetrator mobile device 42 to download the accident reporting application from the URL and follow the instructions of the accident reporting application. Examples of the instructions of the accident reporting application include providing a contact such as a perpetrator location information and e-mail address, providing driver's license of the perpetrator and liability insurance certificate, the transmission of a captured image obtained by capturing the abnormal part that is the damaged part of the damaged vehicle, the transmission of a captured image obtained by capturing the collision part of a perpetrator-driven vehicle, or the like. The perpetrator-driven vehicle is a vehicle driven by the perpetrator that causes damage to the damaged vehicle. The damaged vehicle is the vehicle 10 that is damaged by the perpetrator-driven vehicle. In other words, the instruction of the accident reporting application is an instruction to make the perpetrator provide the accident certification information being the information necessary to prepare the accident certificate. Moreover, in a case where the accident reporting application is not downloaded to the perpetrator mobile device 42, a list of similar information matters can be shown to the perpetrator mobile device 42, and the provision of such information matters or images can be requested.

The control unit 30D of the accident reporting server 30 can use OCR software to read the matters stated in the accident certificate from the image. If the read image is unclear, it is only required that the control unit 30D instructs the perpetrator mobile device 42 to capture the image again through the accident reporting application. This processing can be performed by the control unit 30D of the accident reporting server 30 or can be performed by an operator who operates the accident reporting server 30.

The description above is the most typical and preferable case in which the vehicle monitoring apparatus 20 first reports to the accident reporting server 30, and then the perpetrator accesses the accident reporting server 30. However, it often happens that the perpetrator does not access the accident reporting server 30. It is, to put it briefly, a hit-and-run case. A case can occur in which the control unit 30D of the accident reporting server 30 receives approval information used to approve submission of an accident report and filing of a report of damage from the victim mobile device 44 without the perpetrator accessing the accident reporting server 30. In this case, the control unit 30D transmits the report of damage to an information processing apparatus of the police officer or an information processing apparatus managed by the police. The report of damage is a report that the victim submits to the police when the perpetrator does not report. The victim preferably causes the vehicle monitoring apparatus 20 to transmit an image of the surroundings of the vehicle and approves the filing of the report of damage when there is no perpetrator nor perpetrator-driven vehicle in the vicinity and the accident reporting server 30 is not accessed by the perpetrator.

Specifically, after the vehicle monitoring apparatus 20 determines that there is damage and reports the damage report to the accident reporting server 30 or the victim mobile device 44, in a case where there is no report from the perpetrator even after a predetermined time has passed and it is checked that the victim is damaged, the control unit 30D of the accident reporting server 30 determines that a hit-and-run occurs. The control unit 30D of the accident reporting server 30, when receiving the approval information from the victim mobile device 44, determines that the victim has approved the filing of the report of damage. Moreover, upon determining that there is damage, in the case where the vehicle monitoring apparatus 20 reports the damage report only to the accident reporting server 30, the accident reporting server 30 can issue, at the time when a predetermined time has passed without report from the perpetrator, notification for requesting the victim mobile device 44 to check that the damage has occurred and to approve the filing of the report of damage.

In the event of an accident of a collision with a parked vehicle 10, the perpetrator is obliged to report the accident to the police. If the perpetrator has not reported the accident to the police, the accident reporting server 30 transmits a report of damage to the police, subject to the approval of the victim. In this case, the control unit 30D of the accident reporting server 30 can transmit data, such as the damage-reporting image 62 included in the damage report received from the vehicle monitoring apparatus 20, the captured images before and after the collision, the time when the collision is detected, the vehicle location information upon the collision, or the like. It is required that the data is transmitted in the form attached to the report of damage.

The reason for waiting for the approval by the victim is to prevent the unnecessary filing of a report of damage that can be caused in a case where there is no actual damage to the vehicle 10, a case where the victim decides not to file a report of damage due to minor damage, or a case where the perpetrator reports to the police without accessing the accident reporting server 30. The processing performed to file a report of damage, after the determination that a hit-and-run case occurs and the checking and approval of the damage by the victim, can be handled manually by an operator of the accident reporting server 30, not processed by the control unit 30D of the accident reporting server 30.

The vehicle monitoring apparatus 20 typically first reports to the accident reporting server 30, and then the perpetrator accesses the accident reporting server 30. However, an exceptional case occurs in which the perpetrator accesses the accident reporting server 30 even though there is no report from the vehicle monitoring apparatus 20 to the accident reporting server 30. In one example, it is presumed that the acceleration is low because the door of the perpetrator-driven vehicle hits the damaged vehicle with a weak force, and the damage is not detected even by comparing the images. In this case, the damaged vehicle does not access the accident reporting server 30, but if the damaged vehicle typically displays the URL in a visible form, it is also conceivable that the perpetrator who causes the collision can access the accident reporting server 30 by using the own perpetrator mobile device 42. In this event, the accident reporting server 30 communicates with the damaged vehicle to investigate the presence or absence of an accident and remotely operates the vehicle monitoring apparatus 20. Accordingly, the accident reporting server 30 searches for the captured image recorded in the vehicle monitoring apparatus 20 or the result sensed by the sound sensor 12 and the acceleration sensor 13. Supposing there is something that corresponds to the acceleration determined to be equal to or less than a sensing threshold or the difference in the vehicle-body images, the accident reporting server 30 can overturn the original determination into the determination that there is damage. In addition, the accident reporting server 30 requests the vehicle monitoring apparatus 20 to transmit a captured image of the entire circumference of the damaged vehicle. The accident reporting server 30, when determining that there is no significant damage, can inform the perpetrator of situations in which the perpetrator is allowed to leave the scene because of the reception of the report by the insurance company or there is no reporting to the police because of being agreed with the user of the vehicle 10. Such processing is an exceptional incident response, so this processing can be handled manually by an operator of the accident reporting server 30, not performed by the control unit 30D of the accident reporting server 30.

Moreover, there is a case where no report from the vehicle 10 nor from the perpetrator, and the report from the victim arrives at the accident reporting server 30 first in some cases. In one example, in the case where the acceleration is low because the door of the perpetrator-driven vehicle hits the damaged vehicle with a weak force and the damage is not detected even by comparing the images, the damaged vehicle does not report to the accident reporting server 30. In this situation, the perpetrator does not voluntarily report to the accident reporting server 30, and if the victim notices the damage upon returning to the site of the vehicle 10, it means that a hit-and-run occurs formally. In this case as well, the accident reporting server 30 remotely operates the vehicle monitoring apparatus 20 of the damaged vehicle, searches for the captured image recorded in the vehicle monitoring apparatus 20 or the result sensed by the sound sensor 12 and the acceleration sensor 13. Supposing there is the acceleration determined to be equal to or less than the threshold or the difference in the vehicle-body images, the accident reporting server 30 can overturn the original determination into the determination that there is damage. In this case, the perpetrator is responsible, but the accident is not reported to the police, so contacting the police is made through the filing of the report of damage. In this event, it is only required that the accident reporting server 30 attaches the captured images and data before and after the collision obtained by searching the vehicle monitoring apparatus 20 to the report of damage and reports to the police. However, there are many cases where the vehicle monitoring apparatus 20 does not detect minor damage, so the victim is often unlikely to file the report of damage. Thus, it is preferable that the accident reporting server 30 has a procedure for transmitting the report of damage on condition of the approval by the victim.

The police officer mobile device 46 of the police receives an accident report or a report of damage transmitted from the accident reporting server 30 as the accident report or the report of damage to be given from the parties involved in the accident. The police officer mobile device 46 can also download the application from the URL of the accident reporting server 30. Thus, the accident report or the report of damage does not include captured images or the like, and the images or data uploaded to the accident reporting server 30 can be referenced via the application downloaded by the police officer mobile device 46, or the image or data can be made available for download to the police officer mobile device 46 as necessary. In this event, the perpetrator mobile device 42 can access only the information about the perpetrator side, and the victim mobile device 44 can access only the information about the victim side. On the other hand, the police officer mobile device 46 is set to be able to access the information about both the victim and the perpetrator. The accident report or the report of damage includes information about the contact matters of both parties involved in the accident (e.g., the telephone numbers of both parties), so the parties can be asked to state the contents of the report as necessary. The police officer prepares a document such as a police record that is the basis of the accident certificate according to the confirmed information. If the accident report prepared by the accident reporting server 30 is prepared according to the format of the accident certificate and there are no doubtful points in the matters stated, the police officer can approve the accident report as the work of preparing the police record. In the case where a police officer performs the work described above on the above application, the approval work is only necessary to press the approval button. If the approval by the police officer is transmitted to the accident reporting server 30, the processing for one case on the accident reporting server 30 side is completed. The insurance claiming can be made on condition of the submission of an accident certificate as before, but it is more efficient for all parties involved in the accident, including the police, to have the police officer approve the accident report.

The description will be given of an example of the procedure of information processing executed by each of the vehicle monitoring apparatus 20, the accident reporting server 30, the perpetrator mobile device 42, the victim mobile device 44, and the police officer mobile device 46. Note that, the information processing procedure described below is an example, and each of the above-mentioned functional components can further execute the above-mentioned various types of processing.

Figure 13:
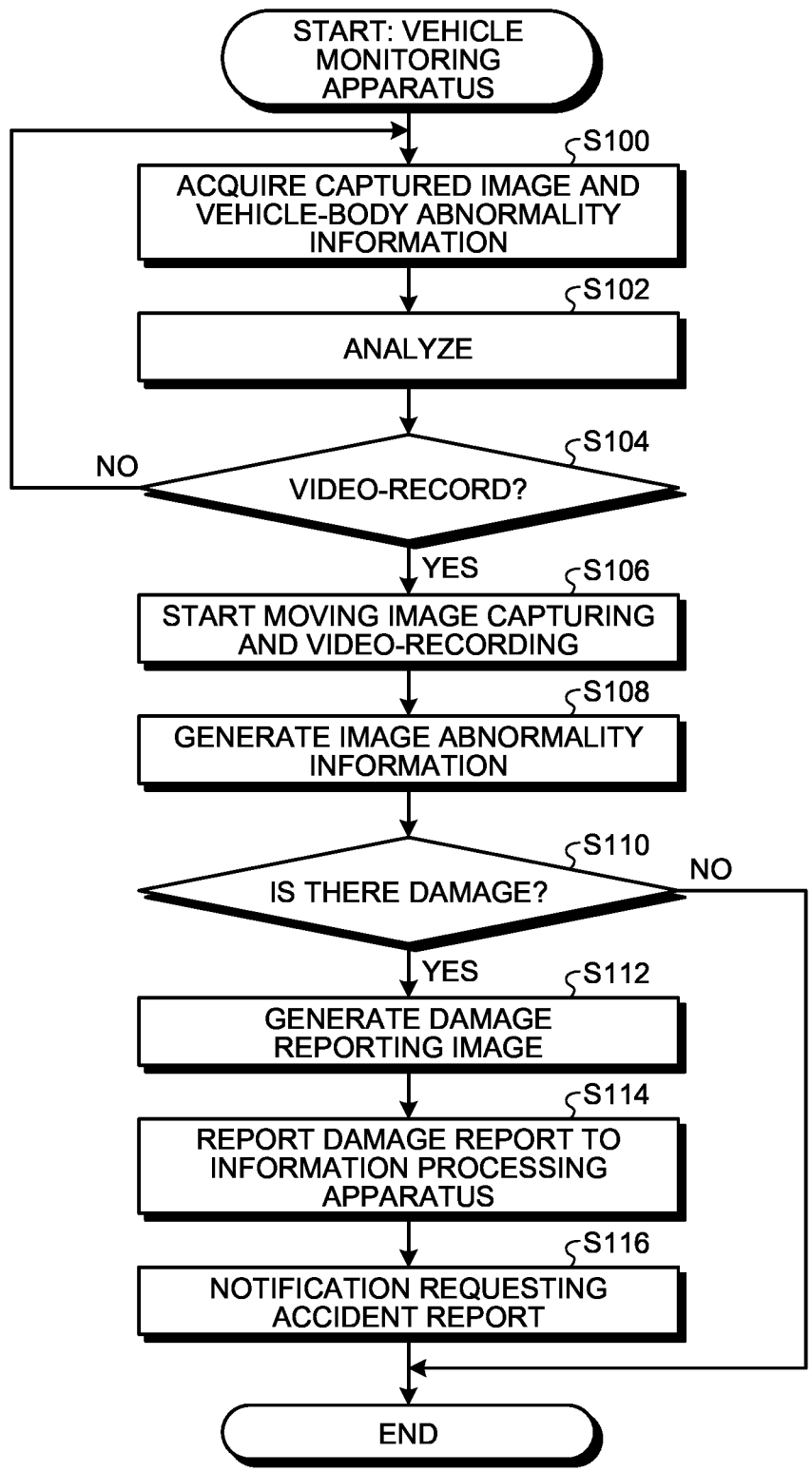
FIG. 13 is a flowchart illustrating the procedure of information processing executed by a vehicle monitoring apparatus according to the embodiment.

The description will be given of an example of the information processing procedure executed by the vehicle monitoring apparatus 20. FIG. 13 is a flowchart illustrating an example of the procedure of information processing executed by the vehicle monitoring apparatus 20.

The image acquisition unit 22A acquires a captured image, and the vehicle-body abnormality information acquisition unit 22B acquires vehicle-body abnormality information (Step S100). The image analysis unit 22C analyzes the captured image acquired in Step S100, and the sound analysis unit 22D analyzes sound information about sound sensed by the sound sensor 12 (Step S102).

The video-recording determination unit 22F determines whether or not to video-record the captured image on the basis of the vehicle-body abnormality information acquired in Step S100 (Step S104). When a negative determination is made in Step S104 (Step S104: No), the routine returns to Step S100. When an affirmative determination is made in Step S104 (Step S104: Yes), the processing proceeds to Step S106. In Step S106, the video-recording determination unit 22F switches the still image capturing to the moving image capturing and initiates the video-recording of the captured image obtained by the moving image capturing (Step S106).

The image abnormality information generation unit 22G estimates variation in the image representation of the exterior of the vehicle body on the basis of the captured image to generate image abnormality information (Step S108). The damage determination unit 22H determines whether or not there is damage on the basis of the vehicle-body abnormality information and the image abnormality information (Step S110). In response to determining that there is no damage (Step S110: No), this routine ends. In response to determining that there is damage (Step S110: Yes), the routine proceeds to Step S112.

In Step S112, the damage-reporting image generation unit 22I generates the damage-reporting image 62 of the exterior of the vehicle body viewed from the virtual viewpoint V2 outside the vehicle on the basis of the vehicle-body abnormality information or the image abnormality information and the captured image (Step S112).

The damage reporting unit 22J reports the damage report including the captured image or the damage-reporting image 62 generated on the basis of the captured image to the information processing apparatus (Step S114). Specifically, the damage reporting unit 22J reports the damage report to the accident reporting server 30 or the victim mobile device 44. The description will be given on the assumption that the damage reporting unit 22J reports only to the accident reporting server 30, and the accident reporting server 30 reports to the victim mobile device 44. Moreover, even in a case where the damage reporting unit 22J reports to both the accident reporting server 30 and the victim mobile device 44, the procedure in the vehicle monitoring apparatus is not changed. Although not illustrated, in a case where the damage reporting unit 22J reports only to the victim mobile device 44, the accident reporting can be made to report to the accident reporting server 30 only when the victim permits the reporting to the accident reporting server 30 by operating the victim mobile device 44. In the procedure in such a case, a loop waiting for the reporting permission from the victim mobile device 44 is added following S114. In this event, if the reporting to the accident reporting server 30 is not permitted, S116 can also be skipped and the routine ends. This is suitable, for example, for the case where the reliability of abnormality detection of the vehicle monitoring apparatus is low, and it is a technique to make a judgment by a person and not to report to the accident reporting server 30 until the person judges and permits. By doing so, the possibility of erroneous accident reporting is made low, but the notification for requesting the accident report to the perpetrator is likely to be delayed, and the perpetrator is likely to leave the scene without reporting.

The accident report requesting unit 22L issues notification for requesting an accident report to the outside of the vehicle (Step S116). Then, this routine ends.

Figure 14:
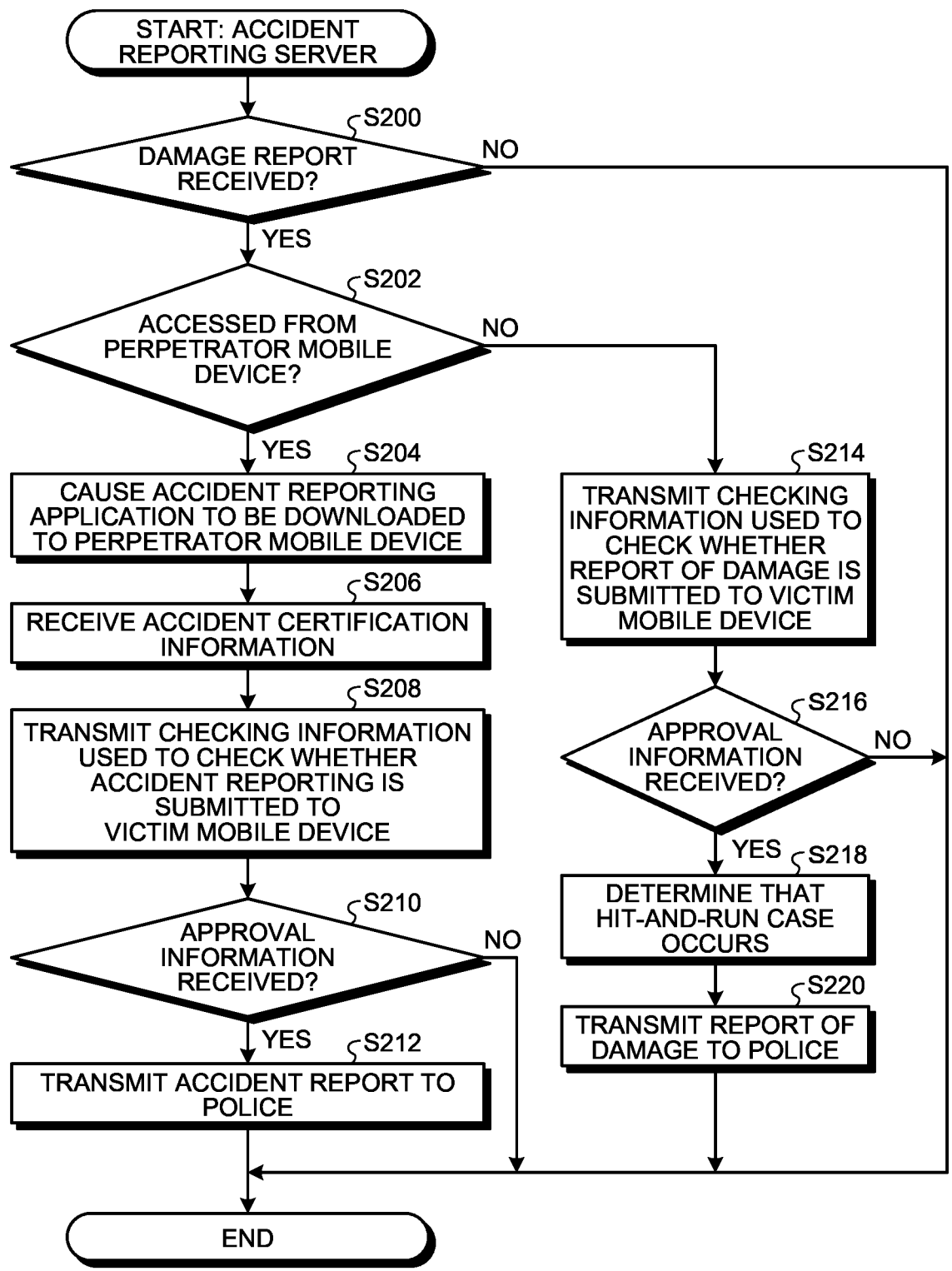
FIG. 14 is a flowchart illustrating the procedure of information processing executed by an accident reporting server according to the embodiment.

An example of the information processing procedure executed by the accident reporting server 30 will be described. FIG. 14 is a flowchart illustrating an example of the procedure of information processing executed by the accident reporting server 30. The transmission or reception of various types of information performed by the control unit 30D of the accident reporting server 30 is performed via the communication unit 30A.

The control unit 30D of the accident reporting server 30 determines whether or not the damage report is received from the vehicle monitoring apparatus 20 (Step S200). When a negative determination is made in Step S200 (Step S200: No), this routine ends. When an affirmative determination is made in Step S200 (Step S200: Yes), the routine proceeds to Step S202.

The control unit 30D determines whether or not the URL of the accident reporting server 30 is accessed from the perpetrator mobile device 42 (Step S202). When an affirmative determination is made in Step S202 (Step S202: Yes), the routine proceeds to Step S204. Moreover, in the notation of the flowchart, the waiting loop is omitted in some cases, but it can be understood from the description. In this example, there is a timer that starts counting upon proceeding to Step S202. Thus, when the URL of the accident reporting server 30 is not accessed from the perpetrator mobile device 42, the loop returning to Step S202 is omitted on condition that the timer does not exceed a predetermined value. In other words, in S202, if the URL of the accident reporting server 30 is accessed from the perpetrator mobile device 42 within a predetermined time, the routine proceeds to S204. If the predetermined time has elapsed without access to the URL of the accident reporting server 30 from the perpetrator mobile device 42, the routine proceeds to S214. In other cases, the loop for the determination in S202 remains.

In Step S204, the control unit 30D causes the accident reporting application to be downloaded to the perpetrator mobile device 42 (Step S204). In this step as well, the download to the perpetrator mobile device 42 is performed in response to the perpetrator's operation, so there is a loop waiting for the operation.

The control unit 30D receives the accident certification information, which is the information necessary for preparing the accident certificate, from the perpetrator mobile device 42 (Step S206). The acquisition of the accident certification information is performed by the perpetrator mobile device 42, so it can be understood that Step S206 also includes a waiting loop.

The control unit 30D transmits checking information used to check whether the accident reporting is submitted to the victim mobile device 44 (Step S208). The control unit 30D determines whether approval information is received or denial information is received from the victim mobile device 44 via the communication unit 30A (Step S210). If the approval information is received (Step S210: Yes), then the routine proceeds to S212. In Step S212, the control unit 30D transmits the accident report to the police officer mobile device 46 carried by a police officer or an information processing apparatus managed by the police via the communication unit 30A (Step S212), and this routine ends. On the other hand, if the denial information is received in Step S210 (Step S210: No), this routine ends without transmitting the accident report. This is, for example, the case where the victim decides that the damage is minor and does not need to be reported to the police. In Step S210 as well, the loop that stays in Step S210 while waiting for reception is omitted during neither the approval information nor the denial information is received from the victim mobile device 44.

On the other hand, when a negative determination is made in Step S202 (Step S202: No), the control unit 30D transmits checking information used to check whether the report of damage is submitted to the victim mobile device 44 (Step S214). Then, the control unit 30D determines whether or not the approval information is received from the victim mobile device 44 (Step S216). When a negative determination is made in Step S216 (Step S216: No), this routine ends. When an affirmative determination is made in Step S216 (Step S216: Yes), the routine proceeds to Step S218. Here as well, the loop that stays in Step S216 while waiting for reception is omitted during neither the approval information nor the denial information is received from the victim mobile device 44.

The control unit 30D determines that the hit-and-run case occurs (Step S218), transmits the report of damage to the police officer mobile device 46 carried by the police officer or the information processing apparatus managed by the police (Step S220), and then this routine ends.

Figure 15:
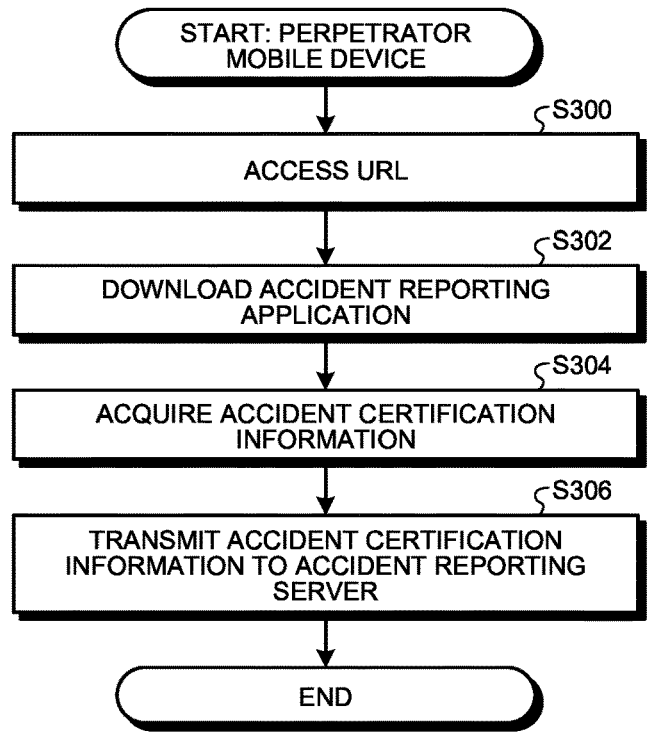
FIG. 15 is a flowchart illustrating the procedure of information processing executed by a perpetrator mobile device according to the embodiment.

An example of the information processing procedure executed by the perpetrator mobile device 42 will be described. FIG. 15 is a flowchart illustrating an example of the procedure of information processing executed by the perpetrator mobile device 42. The transmission or reception of various types of information performed by the control unit 40D of the perpetrator mobile device 42 is performed via the communication unit 40A.

The control unit 40D of the perpetrator mobile device 42 accesses the URL of the accident reporting server 30 (Step S300). Then, the control unit 40D downloads the accident reporting application from the accident reporting server 30 (Step S302).

The operation of the UI unit 40B of the perpetrator mobile device 42 by the perpetrator who operates the perpetrator mobile device 42 following the displayed message makes it possible to input accident certification information that is various types of information of the perpetrator necessary to prepare the accident certificate. This operation by the perpetrator allows the control unit 40D of the perpetrator mobile device 42 to acquire the accident certification information (Step S304). The accident certification information is, for example, the name written on the driver's license of the perpetrator, and the name or the like is acquired by causing the perpetrator to capture an image of the own driver's license and processing the captured image with OCR software.

The control unit 40D transmits the acquired accident certification information to the accident reporting server 30 (Step S306). Then, this routine ends.

Figure 16:
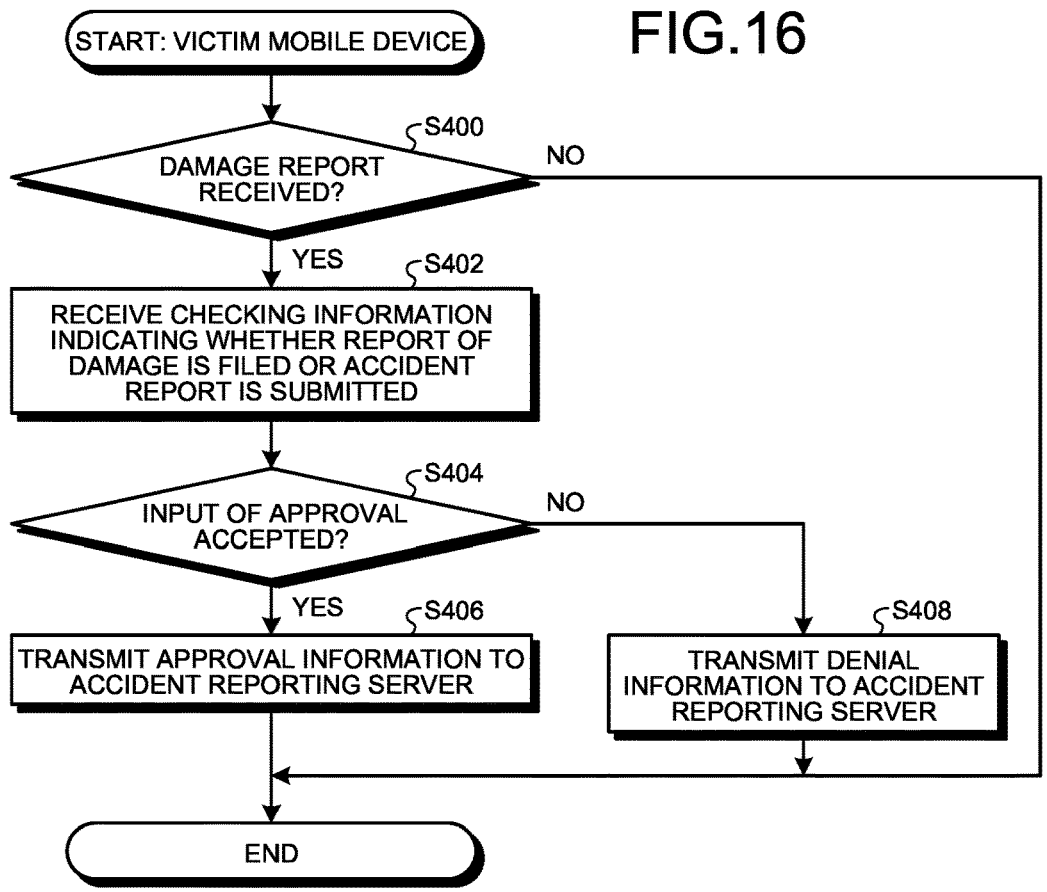
FIG. 16 is a flowchart illustrating the procedure of information processing executed by a victim mobile device according to the embodiment.

An example of the information processing procedure executed by the victim mobile device 44 will be described. FIG. 16 is a flowchart illustrating an example of the procedure of information processing executed by the victim mobile device 44. The transmission or reception of various types of information performed by the control unit 40D of the victim mobile device 44 is performed via the communication unit 40A. Moreover, the description will be given of the case where the vehicle monitoring apparatus 20 does not directly report to the victim mobile device 44, and the reporting to the victim mobile device 44 is performed by the accident reporting server 30.

The control unit 40D of the victim mobile device 44 determines whether or not the damage report is received from the accident reporting server 30 (Step S400). When a negative determination is made in Step S400 (Step S400: No), this routine ends. When an affirmative determination is made in Step S400 (Step S400: Yes), the routine proceeds to Step S402.

The control unit 40D receives, from the accident reporting server 30, the checking information indicating whether the report of damage is filed or the accident report is submitted (Step S402). In other words, the determination as of whether the case where there is the reporting from the perpetrator and the reporting to the police is the accident report or the case where there is no reporting from the perpetrator and the reporting to the police is the report of damage is previously made at the time when the victim mobile device 44 receives the damage report from the accident reporting server 30.

The control unit 40D causes the checking information such as the damage-reporting image to be displayed on the UI unit 40B and determines whether or not the input of approval is accepted in accordance with the operation instruction by the victim (Step S404). A case is conceivable in which the victim checks the damage-reporting image or the like and approves the transmission of the accident report or the report of damage if compensation is considered to be necessary, and the UI unit 40B accepts the input of approval (Step S404: Yes). In this case, the control unit 40D transmits the approval information about the filing of the report of damage or the submission of the accident report to the accident reporting server 30 via the communication unit 40A (Step S406). Then, this routine ends.

On the other hand, in a case where the victim checks the damage-reporting image or the like and considers that compensation is not necessary because the damage is minor, that is, it is not necessary to report to the police, the accident reporting or the transmission of the report of damage is denied. Thus, in a case where the UI unit 40B receives the input of denial (Step S404: No), the control unit 40D transmits the denial information indicating that the filing of the report of damage or the submission of the accident report is denied to the accident reporting server 30 (Step S408). Then, this routine ends. In this stage as well, the loop that stays in S404 is omitted during the UI unit 40B does not receive the input of approval or the input of denial.

The description above is given of the case where the vehicle monitoring apparatus 20 does not report directly to the victim mobile device 44, and the reporting to the victim mobile device 44 is performed by the accident reporting server 30. However, the victim mobile device 44 can receive the reporting from the vehicle monitoring apparatus 20 substantially at the same time as the accident reporting server 30 receive the reporting. In this manner, it is possible for the victim to notice that the vehicle is damaged in a short time. However, such a way results in an increase in the likelihood that the victim goes to the scene of the damage and encounters the perpetrator. This situation should be avoided for the present invention, so it is out of the main points of the description, and the illustration is also omitted. In the case where the vehicle monitoring apparatus 20 reports directly to the victim mobile device 44, there can be measures to avoid a situation of encountering the perpetrator, which can be implemented by the victim mobile device 44. As the measures, the image around the vehicle received from the vehicle monitoring apparatus 20 can be displayed, and notification for requesting the victim to be prudent can be added such as "It is safer not to return to the vehicle while the perpetrator is at the scene because we are giving notice to the perpetrator to report". This is an operation corresponding to Step S402 in the flowchart, but as a result, it is up to the perpetrator to submit an accident report or file a report of damage. Thus, Step S402 can be divided into multiple steps. Specifically, there can be provided a step of displaying the damage report or the surrounding images transmitted by the vehicle, a loop of waiting for the perpetrator's reporting within a predetermined time, and a step of approving either the filing of a report of damage or the submission of an accident report in accordance with the presence or absence of the perpetrator's reporting.

Figure 17:
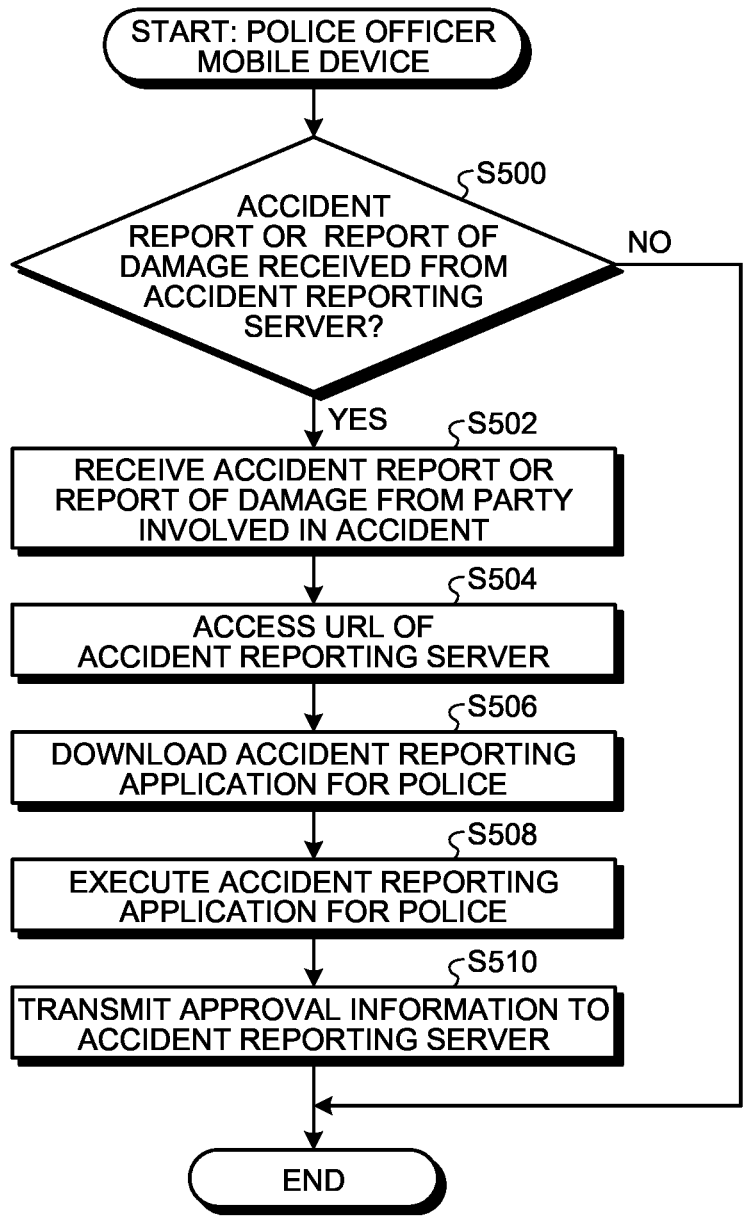
FIG. 17 is a flowchart illustrating the procedure of information processing executed by a police officer mobile device according to the embodiment.

An example of the information processing procedure executed by the police officer mobile device 46 will be described. FIG. 17 is a flowchart illustrating an example of the procedure of information processing executed by the police officer mobile device 46. The transmission or reception of various types of information performed by the control unit 40D of the police officer mobile device 46 is performed via the communication unit 40A.

The control unit 40D of the police officer mobile device 46 determines whether or not the accident report or the report of damage is received from the accident reporting server 30 (Step S500). When a negative determination is made in Step S500 (Step S500: No), this routine ends. When an affirmative determination is made in Step S500 (Step S500: Yes), the routine proceeds to Step S502.

The control unit 40D receives the accident report or the report of damage received in Step S500 as the accident report or the report of damage from the party involved in the accident (Step S502). The accident report or the report of damage is an e-mail. When the written URL of the accident reporting server 30 is accessed (Step S504), the accident reporting application for the police is downloaded from the accident reporting server 30 (Step S506). In the case where the accident reporting application for the police is executed, the police officer is able to browse the accident certification information, that is, information about the matters stated in the accident certificate or the evidence that supports the accident, such as the captured image of the damaged part of the vehicle. In addition, the police officer is able to download the browsed information, the captured image, the document file of the accident certificate (draft), or the like as necessary (Step S508). If the police officer determines that the information necessary for issuing the accident certificate is obtained, then the police officer transmits the approval information indicating that the acceptance of the accident report or the report of damage is approved to the accident reporting server 30 (Step S510). Then, this routine ends.

As described above, the vehicle monitoring apparatus 20 of the present embodiment includes the image acquisition unit 22A, the vehicle-body abnormality information acquisition unit 22B, the damage determination unit 22H, and the damage reporting unit 22J. The image acquisition unit 22A acquires a captured image including an image representation showing the exterior of the vehicle body of the vehicle 10. The vehicle-body abnormality information acquisition unit 22B acquires vehicle-body abnormality information indicating an abnormality in the vehicle 10. The damage determination unit 22H determines the presence or absence of damage in the vehicle body on the basis of the captured image and the vehicle-body abnormality information. The damage reporting unit 22J reports, in accordance with the damage determination result, the damage report including the captured image or an image generated on the basis of the captured image to the information processing apparatus.

The technique in the related art creates a synthesized image by incorporating an image representation of a prepared 3D model of a vehicle body into the center corresponding to a vehicle of an omnidirectional image, which is obtained by synthesizing the captured images of the entire circumference of the vehicle. For this reason, the user of the vehicle fails to check the actual exterior condition of the vehicle because only a 3D model image representation rather than an actual image of a vehicle body as a vehicle image of the synthesized image is displayed on a smartphone carried by the user of the vehicle. In other words, in a case of an accident that a vehicle is damaged, although the image of the surroundings of the vehicle is shown on the smartphone of the user of the vehicle, the actual image representation of the vehicle itself is not shown in the displayed image. Thus, it is necessary for the user of the vehicle to visit the accident scene or actually visually check the exterior of the vehicle directly, which imposes a physical burden on the user of the vehicle. In addition, if the user of the vehicle who is a victim of the vehicle accident visits the accident scene, he/she is likely to encounter a perpetrator, and in the process of handling the accident to receive compensation for the damage, the victim's personal information is likely to be obliged to be exposed to the perpetrator. Such a thing can be a great psychological burden on the user of the vehicle. In other words, the related art imposes a heavy burden on the user of the vehicle.

In consideration of the above, according to the vehicle monitoring apparatus 20 of the present embodiment, the image acquisition unit 22A acquires a captured image including an image representation showing the exterior of the vehicle body of the vehicle 10. The vehicle-body abnormality information acquisition unit 22B acquires vehicle-body abnormality information indicating an abnormality in the vehicle 10. The damage determination unit 22H determines the presence or absence of damage in the vehicle body on the basis of the captured image and the vehicle-body abnormality information. The damage reporting unit 22J reports, in accordance with the damage determination result, the damage report including the captured image or an image generated on the basis of the captured image to the information processing apparatus.

Thus, in the present embodiment, the user of the vehicle 10 that checks the damage report that is reported is able to check the damage without directly visually checking the exterior of the vehicle 10.

Thus, the vehicle monitoring apparatus 20 of the present embodiment is capable of reducing the burden on the user of the vehicle 10.

In the technique disclosed in JP 6347934 B as the related art, it is possible to view an image capturing the exterior of the vehicle with a mobile device. However, the bird's-eye view in the related art displays the vehicle replaced with a model representation, so the damage to the vehicle fails to be checked. In one example, there is a case where a vehicle in question is hit by another vehicle nearby when a person in the other vehicle opens the door. In this case, if the person of the other vehicle who hits the vehicle in question gets in the other vehicle and closes the door, no one is shown and no scratches on the vehicle in question are shown even if the image displayed on the mobile device is viewed. Thus, although damage occurs, there is a possibility of misunderstanding that no abnormality is caused by the appearance of the image displayed on the mobile device. In addition, as described later, if the perpetrator leaves the accident scene without reporting the accident, there is a high possibility that the user will suffer financial loss.

Moreover, the vehicle monitoring apparatus in the related art senses the force applied to the vehicle body with an acceleration sensor, so the wind pressure of a vehicle passing nearby and the operation of mechanical parking lot facilities can be sensed in some cases. In other words, it is notified that there is a shock even though there is no damage, and the image capturing the exterior of the vehicle can be checked with the mobile device in response to the notification. Such a wasteful checking work causes a time loss and a mental burden on the user. When damage actually occurs, the perpetrator can be shown in the image on the mobile device viewed by the victim who is the user of the damaged vehicle, resulting in the victim being hesitant to go to the scene. There are actually many cases where troubles in the parking lot lead to serious incidents, so encountering the perpetrator in the parking lot is a significant psychological burden on the victim. However, if the perpetrator leaves the scene without the victim visiting the parking lot, it is difficult to identify the perpetrator, failing to expect to smoothly receive compensation. Although it is possible to request an investigation by presenting the image recorded by the vehicle monitoring apparatus to the police, in many cases, it is not possible to identify the perpetrator or prove the damage, so there is a possibility of significant financial loss for the user.

Moreover, in the case as well where the perpetrator voluntarily submits a report to the police and the compensation can be received through the perpetrator's insurance, the personal information matters of the perpetrator and the victim are written in the accident certificate. Thus, the personal information is disclosed to each other between the perpetrator and the victim. This violates the principle of personal information protection that "The personal information is not disclosed against the person's will".

On the other hand, the vehicle monitoring system 1 of the present embodiment includes the vehicle monitoring apparatus 20 and an information processing apparatus that communicates with the vehicle monitoring apparatus 20. The information processing apparatus includes at least one of the accident reporting server 30 that provides an accident report agency service, the victim mobile device 44 that is a victim mobile device regarding the vehicle 10, and the perpetrator mobile device 42 that is a perpetrator mobile device regarding the vehicle 10. In addition, the information processing apparatus can further include the police officer mobile device 46, which is an information processing apparatus for police officers, or an information processing apparatus managed by the police.

Then, as described above, the vehicle monitoring apparatus 20, the accident reporting server 30, the perpetrator mobile device 42, the victim mobile device 44, and the police officer mobile device 46 execute the processing described earlier in the present embodiment.

Thus, it is possible for the vehicle monitoring system 1 of the present embodiment to minimize the burden and loss on the user. Specifically, the vehicle monitoring system 1 of the present embodiment providing a means for the perpetrator to easily report an accident makes it possible to prevent the perpetrator from leaving without reporting the accident, allowing the victim to get reimbursed. In addition, the vehicle monitoring system 1 using the mobile device 40 as an intermediary means makes it possible to avoid being bothersome due to the reporting of unnecessary abnormality detection. In addition, the vehicle monitoring system 1 makes it possible to easily check the damage when the vehicle body is damaged and to present contact for negotiation to the perpetrator. Thus, it is possible for the victim to receive compensation without having to encounter the perpetrator or having the personal information disclosed.

Moreover, according to the vehicle monitoring system 1 of the present embodiment, each person concerned can obtain an incentive.

The incentives for the police are first described.

The collision with the parked vehicle 10 is a property damage accident, and if a party involved in the accident appears in the police, the police will not be dispatched. This is because the number of property damage accidents is very high, and the burden on the police is heavy. In one example, the number of property damage accidents is seven million per year according to the statistics of Japan in 2009, which is approximately six times that of personal injury accidents. Thus, the police are dispatched only if the perpetrator and the victim are unable to appear before the police. The reason the parties involved in the accident appear before the police is that an accident certificate is required for insurance claims. As a side note, the accident certificate can be issued by online application. The insurance company asks for the accident certificate to prevent fraudulent claims due to the forgery of the accident, but on this account, the police have ascertained seven million property damage accidents that are not criminal cases. If a system is implemented of outputting data that proves the accident by the damaged vehicle, submitting the image and related information supported by the perpetrator, and checking these and issuing accident certificates by police it is possible to reduce the burden on the police and to prevent fraudulent billing fraud.

According to the vehicle monitoring system 1 of the present embodiment, it is possible to reduce the burden on the police and to prevent fraudulent insurance claims.

The description will be given of the issues on the perpetrator side and the incentives for the perpetrator.

The collision with the parked vehicle 10 is a property damage accident, and there is a "reporting obligation" to report to the police. If a person involved in the accident leaves the scene without reporting, it becomes a "hit-and-run" case. In Japan, the sentence is imprisonment for up to one year or a fine of up to 100,000 Japanese yen. However, if a user of the damaged vehicle is not found out, the police will be required to dispatch the damaged vehicle to show it to the police, and the perpetrator stays at the scene for a long time, which is also a burden on the police. In addition, not finding out the victim makes reporting to the police hesitant, resulting in a cause to be a hit-and-run.

The response when the user of the damaged vehicle appears is also great stress. If the police is called, in some cases, the victim also needs to stay at the scene, and long-term troubles such as being asked for a consolation fee can occur for secondary damage such as "purchased meat will go bad" or "have a restaurant reservation".

In the vehicle monitoring system 1 of the present embodiment, if the perpetrator sends an image or information to the accident reporting server 30, the accident reporting server 30 automatically reports to the police. If the damaged vehicle sends an image or information to the accident reporting server 30 and there is a report from the victim side, the "reporting obligation" is satisfied. Thus, the perpetrator can leave the scene without waiting for the victim (user of the damaged vehicle), and the time being get stuck in the scene can be shortened. In addition, the vehicle monitoring system 1 of the present embodiment is a system in which the personal information of the perpetrator is not disclosed to the victim in principle, so there is no need to be afraid of troubles such as the victim requesting a consolation fee later.

The description will be given of the issues on the victim side and the incentives for the victim.

In the case of using the vehicle monitoring apparatus in the related art, if a collision with a parked vehicle 10 is notified to the victim mobile device 44 such as a smartphone of the victim, the victim is needed to return to the vehicle 10 even while shopping or participating in some event. This is because it is difficult to expect the perpetrator to stay at the scene and voluntarily report to the police unless special measures are taken. If the perpetrator is unidentifiable, the repair can be done at the expense of the perpetrator or the perpetrator's insurance, while if the perpetrator is difficult to be identified, the repair cost can be borne by paying the victim's pocket or the own insurance. In the latter case, the insurance premium increases in return for receiving the insurance payment in some cases. Even in the case where the victim abandons private affairs and returns to the vehicle 10, if the perpetrator has already left the scene, it is difficult to ask the perpetrator to bear the repair cost. This is because the perpetrator is unidentifiable, a report of damage is sent to the police to request an investigation, but there are many hit-and-run cases and the probability that the police are far less likely to identify the perpetrator.

The response when there is a perpetrator is also a big stress. The victim is the one who demands compensation from the perpetrator, and it is necessary to disclose personal information such as the victim and the perpetrator showing their driver's licenses to each other, which can cause trouble due to the wordings and actions at the time of response. In addition, if compensation is made through the perpetrator's insurance, it is necessary to report to the police and ask them to create an accident certificate. To do so, it is necessary to ask the police to be dispatched or appear together with the perpetrator. In other words, the victim is getting stuck for a long time to respond to the accident in some cases.

On the other hand, according to the vehicle monitoring system 1 of the present embodiment, providing the information about the perpetrator and transmitting the image and data regarding the damaged vehicle satisfy the reporting to the police and the repair fee can be compensated. Thus, the use of the vehicle monitoring system 1 of the present embodiment eliminates the need for the victim to return to the vehicle 10 and eliminates all the risk of being stuck for responding with the perpetrator or police and trouble caused by exchanging personal information with the perpetrator.

The description will be given of the issues on the insurance company side and the incentives for the insurance company.

The profit that an insurance company can obtain is the rationalization of office work. The insurance company's accident handling affairs are often paper-based and not digitized. In one example, an application for the online issuance of an accident certificate can only be made by the parties involved in the accident, so it is necessary to get a power of attorney from the party involved (the applicant for the insurance claim from the perspective of the insurance company) and receive a paper accident certificate at the window of the Japan Safe Driving Center. Then, it is necessary to digitize the accident certificate or visually collate the matters stated in the accident certificate submitted by requesting the applicant to submit the accident certificate with the information declared by the claimant. The insurance company requesting the accident certificate is intended to prevent false claims for insurance premiums or insurance fraud.

Insurance fraud falls, for example, under the following cases. It is assumed that a person A causes the own vehicle to collide with a parked white vehicle and escapes from the scene even though the bumpers of both vehicles are damaged, and brings the damaged vehicle to a shop of repairer C. In addition, the damage to the insured vehicle caused by the own fault is typically not covered by insurance, and the repair cost is unable to be covered by insurance money, but assuming that the repairer C introduces an acquaintance B who is a white vehicle and has not yet repaired a bumper damaged by a self-damage accident that is not covered by insurance. When the person A and the acquaintance B report a property damage accident to a police officer, the police officer asks the parties involved in the accident (person A and acquaintance B) to drive the vehicle and appear before the police station. This means that omitting the investigation for corroborative evidence, that is, on-site verification, such as photographing the accident scene, listening to the witness testimony of third parties, and collecting the dropped paint pieces. While, it is also an unavoidable measure against the background that it will not be a criminal case unless it is hit-and-run, and there are many property damage accidents, and if the rules for on-site verification even for property damage accidents are made, resulting in excessive work. In this case, the police officer will listen to both parties involved in the accident who have voluntarily appeared as the investigation for corroborative evidence that can be done at the police station, compare the damaged bumpers of both vehicles, and if there is no conflict with the hearing content, and prepares a police record as heard. The Japan Safe Driving Center prepares an accident certificate based on this police record. In a case where the person A testifies to hit the vehicle of the acquaintance B, the insurance company contracted by the person A, when receiving the accident certificate, pays the cost of repairing the damage to the vehicle of the acquaintance B as insurance money. When the person A and the acquaintance B share the insurance money, make up for it if there is a shortage, and request the repairer C to repair, the repairer C can receive an order to repair two vehicles.

According to the vehicle monitoring system 1 of the present embodiment, in event of damage to a vehicle, a damage-reporting image is created and immediately reported to the accident reporting server 30 by the damaged vehicle, so it is extremely difficult to forge an accident and deceive the police after the accident. Accordingly, it is possible to prevent the insurance money from being stolen on the basis of the accident certificate that is contrary to the fact. In addition, it is possible to have a system in which the accident reporting server 30 can serve as a window to collect the information matters written in the accident certificate, and the police can check and approve the information matters stated. Thus, upon approving the information collected by the accident reporting server 30 by the police, a mechanism can be employed to determine that the conditions for paying the insurance premium are satisfied. In this manner, the insurance company does not need to request the issuance of an accident certificate again. In other words, the work from reporting the accident to paying the insurance premium can be completed on the accident reporting server 30, so the insurance company's accident handling work can be significantly streamlined over current systems that require paperwork (e.g., an accident certificate or a power of attorney for issuing the accident certificate).

Thus, the establishment and operation of the accident reporting server 30 of the present embodiment by the insurance company are economically reasonable because it is beneficial to reduce the paperwork cost. In addition, the insurance company can return a part of the profit to the policyholder in the form of a reduction in insurance premiums.

The description will be given of the incentives for automobile companies.

In the case of Japan, as of March 2021, "Japan Mayday Service Co., Ltd." in which automobile companies and insurance companies are shareholders provides HELPNET (emergency call service). The automobile companies sell vehicles equipped with an emergency call button and a function to automatically notify depending on acceleration on a high-value-added line. The high-value-added line is, for example, a luxury car. However, emergency calls are sent to the police and fire departments or ambulances and do not cover property damage accident insurance. In other words, there is room for improvement as a high-value-added service.

On the other hand, the use of the vehicle monitoring system 1 of the present embodiment, in the event of an accident that damages a parked vehicle, makes it possible for the automobile manufacturer to sell the vehicle 10 as a higher value-added product equipped with an accident reporting function that allows the owner to receive compensation without being bothered due to accident response. In addition, in the case where the insurance company reduces the insurance premium for the vehicle 10 provided with the accident reporting function, the dealer can demonstrate strongly that the function can be used substantially at a low price. In other words, the use of the vehicle monitoring system 1 of the present embodiment makes it possible to provide a higher value-added service while producing a sense of cheapness.

The description will be given of a mechanism for protecting personal information between the perpetrator and the victim.

Upon a vehicle accident, it is usual for the parties involved in the accident to mutually check their driver's licenses. The personal information matters of the parties are also written in the accident certificate, and the parties can obtain the accident certificate. In other words, the perpetrator, when committing an act of perpetrating the victim's car, can obtain the victim's personal information, which is widely practiced in common sense.

However, this violates the principle of personal information protection that "The personal information is not disclosed against the person's will". In particular, it can be utterly unreasonable because the victim is forced to disclose the victim's own personal information to the perpetrator regardless of the victim's will, even though there is no negligence.

In a property damage accident, the victim only needs to be compensated for the repair cost from the insurance company on the perpetrator's side, so it should not be necessary for the perpetrator to disclose personal information or know the perpetrator's personal information. The perpetrator does not have to compensate the victim as an individual, but the insurance company pays for the accident, so it should not be necessary to disclose personal information to the victim or know the victim's personal information. Thus, for example, if a means for requesting disclosure is provided in case of a dispute in a trial on the basis of "With the consent of the other party, an accident certificate containing the personal information of the other party can be obtained" (e.g., without the consent of the other party, an accident certificate in which the personal information of the other party is blacked out will be issued) in accordance with the principle of personal information protection, it is possible to achieve both personal information protection and the right to know.

As a psychological factor for the perpetrator to hit and run, there is a fear of personal trouble with the victim. In the event of an accident, if the vehicle does not disclose personal information to the victim and the insurance company explains that the insurance company will take over the compensation, the perpetrator will have one less reason to hesitate to report.

As described above, in the vehicle monitoring system 1 of the present embodiment, the notification, which requests the accident report requesting unit 22L of the vehicle monitoring apparatus 20 to perform the accident report, can include a message informing the perpetrator of the policy of personal information protection. For example, as described above, the message to be conveyed to the perpetrator can be, for example, a sound as follows: "The parties involved in the accident are obliged to report to the police. You can report to the police by reading the QR code posted on the back window and accessing the URL. The personal information you entered will only be disclosed to police and insurance company, not to victims.".

Thus, the use of the vehicle monitoring system 1 of the present embodiment makes it possible to prevent the perpetrator from hesitating to report.

Moreover, the program for executing the information processing in the embodiment described above has a module configuration including each of the plurality of functional units. As for actual hardware, for example, the CPU 25A reads and executes an information processing program from the ROM 25B. Then, each of the plurality of functional units described above is loaded on the RAM 25C, and each of the plurality of functional units described above is generated on the RAM 25C. Moreover, it is also possible to implement the entirety or a part of each of the plurality of functional units described above by using dedicated hardware such as an application-specific integrated circuit (ASIC) or a field-programmable gate array (FPGA).

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

According to the vehicle monitoring apparatus, the vehicle monitoring system, and the vehicle monitoring method of the present disclosure, it is possible to reduce the burden on the user or owner of the vehicle.

What is claimed is:

1. A vehicle monitoring apparatus, comprising:
a hardware processor connected to a memory and configured to function as
an image acquisition unit serving to acquire a captured image including an image representation of an exterior of a vehicle body of a vehicle,
an image recording unit serving to record the captured image,
an abnormality information acquisition unit serving to acquire vehicle-body abnormality information indicating an abnormality in the vehicle body,
a damage determination unit serving to determine a presence or an absence of damage to the vehicle body based on the captured image and the vehicle-body abnormality information, and
a damage reporting unit serving to report, to an information processing apparatus, a damage report including the captured image or an image generated based on the captured image, the damage report being reported in accordance with a result of a determination on the damage,
wherein the image recording unit serves to
determine, based on the vehicle-body abnormality information, whether or not to video-record the captured image, and
be more likely to determine not to video-record the captured image in a first case where a number of determination mismatches is equal to or larger than a predetermined number of times than in a second case where the number of determination mismatches is less than the predetermined number of times, with the determination mismatches occurring when the damage determination unit determines that there is no damage upon being determined to video-record the captured image.

2. The vehicle monitoring apparatus according to claim 1, wherein the hardware processor is configured to further function as an image abnormality information generation unit serving to estimate variation in the image representation of the exterior of the vehicle body based on the captured image and to generate image abnormality information,
wherein the damage determination unit serves to determine the presence or the absence of the damage to the vehicle body based on the vehicle-body abnormality information and the image abnormality information.

3. The vehicle monitoring apparatus according to claim 2, wherein the hardware processor is configured to further function as a damage-reporting image generation unit serving to generate a damage-reporting image of the exterior of the vehicle body as viewed from a virtual viewpoint outside the vehicle based on the vehicle-body abnormality information or the image abnormality information and the captured image,
wherein the damage reporting unit serves to report the damage report including the damage-reporting image to the information processing apparatus.

4. The vehicle monitoring apparatus according to claim 3, wherein the damage-reporting image generation unit serves to generate the damage-reporting image by transforming a projection image into a viewpoint-transformed image as viewed from the virtual viewpoint, the projection image being obtained by projecting the captured image onto a projection plane corresponding to a surface of the vehicle body.

5. The vehicle monitoring apparatus according to claim 4, wherein
the vehicle-body abnormality information includes at least one of first information about acceleration sensed by an acceleration sensor provided in the vehicle or second information about sound sensed by a sound sensor provided in the vehicle, and
a direction of the virtual viewpoint upon generation of the damage-reporting image by the damage-reporting image generation unit substantially coincides with at least one of a first direction of the acceleration sensed by the acceleration sensor, a second direction of the sound sensed by the sound sensor, or a third direction indicating the abnormality represented by the image abnormality information.

6. The vehicle monitoring apparatus according to claim 4, wherein the damage-reporting image generation unit serves to
project the captured image onto the projection plane, and
generate the damage-reporting image in which a region in the projection plane where the captured image is not projected is replaced with an alternative image having a form different from a projection region where the captured image is projected.

7. The vehicle monitoring apparatus according to claim 6, wherein the alternative image is a first image representation of a wire-frame model of the vehicle body or a second image representation of a 3D model colored with a color different from a color of the vehicle body.

8. The vehicle monitoring apparatus according to claim 3, wherein the damage-reporting image generation unit serves to generate the damage-reporting image in which an abnormal part represented by the image abnormality information is highlighted.

9. The vehicle monitoring apparatus according to claim 1, wherein the hardware processor is configured to further function as an accident report requesting unit serving to perform notification for requesting an accident report to an outside of the vehicle in accordance with the result of the determination on the damage.

10. The vehicle monitoring apparatus according to claim 9, wherein the notification for requesting the accident report includes a request for access to an accident reporting server serving to provide an accident report agency service.

11. The vehicle monitoring apparatus according to claim 10, wherein the accident report requesting unit serves to give notification, as notification information, of any of a character string including a URL of the accident reporting server, a QR code including the URL, and a barcode including the URL, the notification information being given by performing at least one of display of the notification information, display of a location to present the notification information, lighting of the location to present the notification information, guidance of a line of sight to the location to present the notification information, and output of sound indicating the location to present the notification information.

12. The vehicle monitoring apparatus according to claim 11, wherein the URL is uniquely provided for each vehicle.

13. The vehicle monitoring apparatus according to claim 9, wherein the notification for requesting the accident report indicates at least one of a personal information protection policy or a request to transmit a driver's license or a photograph of a related vehicle.

14. A vehicle monitoring system, comprising:
the vehicle monitoring apparatus of claim 1; and
the information processing apparatus configured to communicate with the vehicle monitoring apparatus,
wherein the information processing apparatus is one of an accident reporting server serving to provide an accident report agency service, a mobile device carried by a victim who is a user or owner of the vehicle, or a mobile device carried by a perpetrator of the vehicle.

15. The vehicle monitoring system according to claim 14, wherein at least one of the vehicle monitoring apparatus or the accident reporting server transmits the damage report to the mobile device carried by the victim.

16. The vehicle monitoring system according to claim 14, wherein the accident reporting server is configured to, when approval information is received from the mobile device carried by the victim, transmit a report of damage to a first information processing apparatus carried by a police officer or to a second information processing apparatus managed by police, the approval information indicating approval of submission of an accident report or a report of damage.

17. The vehicle monitoring system according to claim 16, wherein the first information processing apparatus carried by the police officer or the second information processing apparatus managed by the police is configured to receive the accident report or the report of damage transmitted from the accident reporting server, the accident report being received as submitted by an accident party, the report of damage being received as submitted by the victim.

18. A vehicle monitoring apparatus, comprising:
a hardware processor connected to a memory and configured to function as
an image acquisition unit serving to acquire a captured image including an image representation of an exterior of a vehicle body of a vehicle,
an abnormality information acquisition unit serving to acquire vehicle-body abnormality information indicating an abnormality in the vehicle body,
a damage determination unit serving to determine a presence or an absence of damage to the vehicle body based on the captured image and the vehicle-body abnormality information,
a damage reporting unit serving to report, to an information processing apparatus, a damage report including the captured image or an image generated based on the captured image, the damage report being reported in accordance with a result of a determination on the damage,
an image abnormality information generation unit serving to estimate variation in the image representation of the exterior of the vehicle body based on the captured image and to generate image abnormality information, wherein
the damage determination unit serves to determine the presence or the absence of the damage to the vehicle body based on the vehicle-body abnormality information and the image abnormality information,
the vehicle-body abnormality information includes at least one of first information about acceleration sensed by an acceleration sensor provided in the vehicle or second information about sound sensed by a sound sensor provided in the vehicle, and
the damage determination unit serves to be more likely to determine that there is damage in a first case where at least one of a first condition or a second condition is satisfied than in a second case where neither the first condition nor the second condition is satisfied, the first condition including at least two of a first time at which the acceleration sensor senses the acceleration, a second time at which the sound sensor senses the sound, and a third time at which the image abnormality information is detected match with each other, the second condition including at least two of a first direction of the acceleration sensed by the acceleration sensor, a second direction of the sound sensed by the sound sensor, and a third direction of a damaged part of the vehicle body where the image abnormality information is detected match with each other.

19. A vehicle monitoring method implemented by a computer, the vehicle monitoring method comprising:
acquiring a captured image including an image representation of an exterior of a vehicle body of a vehicle;
recording the captured image;
acquiring vehicle-body abnormality information indicating an abnormality in the vehicle body;
determining a presence or an absence of damage to the vehicle body based on the captured image and the vehicle-body abnormality information; and
reporting, to an information processing apparatus, a damage report including the captured image or an image generated based on the captured image, the damage report being reported in accordance with a result of a determination on the damage; and
determining, based on the vehicle-body abnormality information, whether or not to video-record the captured image,
wherein the vehicle monitoring method is more likely to determine not to video-record the captured image in a first case where a number of determination mismatches is equal to or larger than a predetermined number of times than in a second case where the number of determination mismatches is less than the predetermined number of times, with the determination mismatches occurring when the determining determines that there is no damage upon being determined to video-record the captured image.

\* \* \* \* \*